US008069099B2

(12) United States Patent  
Chan et al.

(10) Patent No.: US 8,069,099 B2
(45) Date of Patent: *Nov. 29, 2011

(54) SYSTEMS AND METHODS FOR PRESENTING ADVERTISING CONTENT BASED ON PUBLISHER-SELECTED LABELS

(75) Inventors: Alwin Chan, San Carlos, CA (US); Reiner Kraft, Gilroy, CA (US)

(73) Assignee: Yahoo! Inc., Sunnyvale, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 12/147,430

(22) Filed: Jun. 26, 2008

(65) Prior Publication Data

US 2008/0262931 A1 Oct. 23, 2008

Related U.S. Application Data

(63) Continuation of application No. 11/232,270, filed on Sep. 20, 2005, now Pat. No. 7,409,402.

(51) Int. Cl.
*G06F 17/301* (2006.01)
*G06F 3/00* (2006.01)
*G06F 15/16* (2006.01)
*G07F 19/00* (2006.01)
*G06Q 30/00* (2006.01)
*G06Q 40/00* (2006.01)

(52) U.S. Cl. ...... 705/34; 705/37; 705/14.53; 705/14.17; 707/706; 707/710; 707/722; 707/728; 707/627; 709/203; 715/738

(58) Field of Classification Search ............ 705/51, 705/53, 65, 75, 14.3, 14.4–14.43, 14.46, 705/14.67, 26–27, 319, 330, 344, 347, 10, 705/14.53–14.55, 14.65, 14.17, 1.1, 34, 26.3, 705/26.62, 37; 707/705–710, 732–736, 783–785, 707/627, 722, 728, 731, 920, 944; 709/203–204, 709/215–220, 228; 715/738, 853, 854, 962

See application file for complete search history.

(56) References Cited

U.S. PATENT DOCUMENTS 5,619,709 A 4/1997 Caid et al.
5,712,656 A 1/1998 Ikeda et al.
(Continued)

FOREIGN PATENT DOCUMENTS

WO WO 01/11504 * 2/2001
(Continued)

OTHER PUBLICATIONS

Vinod Anupam et al. "On the security of pay-per-click and other Web advertising schemes",Computer Networks 31 (1999) 1091-1100.*
Marc Langheinrich et al. "Unintrusive customization techniques for Web advertising",Computer Networks 31 (1999) 1259-1272.*
Serif, "PhotoPlus 6.0 Companion", Software Publishing Corporation, 1999, 10 pages.
D1: Finkelstein, L. et al., "Placing Search in Context: The Concept Revisited" 2002 ACM (18 pages).
D2: Sugiyama, K. et al., "Adaptive Web Search Based on User Profile Constructed without Any Effort from Users" WWW2004, May 17-22, 2004 (12 pages).

(Continued)

*Primary Examiner* — Srirama Channavajjala
(74) *Attorney, Agent, or Firm* — Hickman Palermo Truong & Becker LLP

(57) ABSTRACT

Systems and methods allowing publishers to define relationships between their own content items (e.g., World Wide Web pages) and content items created or maintained by other publishers. Publishers insert referral labels into their content items to indicate a referral relationship between or among publishers. In one embodiment, advertisements to be displayed while the user is viewing a content item are selected based at least in part on matching a referral label included in the target content item to a referral label in the advertisement. The referral label can also be used to manage referral-based revenue sharing among publishers.

36 Claims, 14 Drawing Sheets

U.S. PATENT DOCUMENTS

| | | | |
|---|---|---|---|
| 5,714,983 | A | 2/1998 | Sacks |
| 5,752,238 | A * | 5/1998 | Dedrick ............... 705/14.69 |
| 5,771,378 | A | 6/1998 | Holt et al. |
| 5,835,087 | A | 11/1998 | Herz et al. |
| 6,134,532 | A | 10/2000 | Lazarus et al. |
| 6,327,590 | B1 | 12/2001 | Chidlovskii et al. |
| 6,345,289 | B1 * | 2/2002 | Lotspiech et al. ............ 709/203 |
| 6,385,351 | B1 | 5/2002 | Simske et al. |
| 6,446,065 | B1 | 9/2002 | Nishioka et al. |
| 6,490,579 | B1 | 12/2002 | Gao et al. |
| 6,605,120 | B1 * | 8/2003 | Fields et al. .................. 715/239 |
| 6,633,868 | B1 | 10/2003 | Min et al. |
| 6,701,311 | B2 | 3/2004 | Biebesheimer et al. |
| 6,751,780 | B1 | 6/2004 | Neff et al. |
| 6,785,671 | B1 | 8/2004 | Bailey et al. |
| 6,789,073 | B1 | 9/2004 | Lunenfeld |
| 6,816,857 | B1 | 11/2004 | Weissman et al. |
| 6,853,998 | B2 | 2/2005 | Biebesheimer et al. |
| 6,856,967 | B1 * | 2/2005 | Woolston et al. ............ 705/26.3 |
| 6,859,807 | B1 | 2/2005 | Knight et al. |
| 6,868,525 | B1 * | 3/2005 | Szabo ........................... 715/738 |
| 7,028,024 | B1 | 4/2006 | Kommers et al. |
| 7,058,626 | B1 | 6/2006 | Pan et al. |
| 7,137,077 | B2 | 11/2006 | Iwema et al. |
| 7,243,095 | B2 | 7/2007 | Chang et al. |
| 7,284,192 | B2 | 10/2007 | Kashi et al. |
| 7,299,424 | B2 | 11/2007 | Jarrett et al. |
| 7,409,402 | B1 * | 8/2008 | Chan et al. ............................. 1/1 |
| 7,421,426 | B2 | 9/2008 | Berstis et al. |
| 7,467,349 | B1 | 12/2008 | Bryar et al. |
| 7,702,677 | B2 | 4/2010 | Chang et al. |
| 7,979,457 | B1 * | 7/2011 | Garman ........................ 707/768 |
| 2002/0078029 | A1 | 6/2002 | Pachet |
| 2002/0081020 | A1 * | 6/2002 | Shimazu ....................... 382/154 |
| 2002/0099605 | A1 * | 7/2002 | Weitzman et al. .............. 705/14 |
| 2002/0103798 | A1 | 8/2002 | Abrol et al. |
| 2002/0105532 | A1 | 8/2002 | Oblinger |
| 2002/0124263 | A1 * | 9/2002 | Yokomizo ..................... 725/112 |
| 2002/0152222 | A1 | 10/2002 | Holbrook |
| 2003/0055723 | A1 * | 3/2003 | English ........................... 705/14 |
| 2003/0061200 | A1 | 3/2003 | Hubert et al. |
| 2003/0074369 | A1 | 4/2003 | Schuetze et al. |
| 2003/0097357 | A1 | 5/2003 | Ferrari et al. |
| 2003/0135582 | A1 | 7/2003 | Lee et al. |
| 2003/0177059 | A1 * | 9/2003 | Smorenburg et al. .......... 705/10 |
| 2003/0233224 | A1 | 12/2003 | Marchisio et al. |
| 2004/0002959 | A1 | 1/2004 | Alpert et al. |
| 2004/0100510 | A1 | 5/2004 | Milic-Frayling et al. |
| 2004/0103024 | A1 * | 5/2004 | Patel et al. ...................... 705/14 |
| 2004/0117358 | A1 | 6/2004 | Von Kaenel et al. |
| 2004/0193520 | A1 | 9/2004 | LaComb et al. |
| 2004/0199496 | A1 | 10/2004 | Liu et al. |
| 2004/0210468 | A1 | 10/2004 | Rubel et al. |
| 2004/0267943 | A1 * | 12/2004 | Ryu ................................ 709/228 |
| 2005/0060311 | A1 | 3/2005 | Tong et al. |
| 2005/0080780 | A1 | 4/2005 | Colledge et al. |
| 2005/0091111 | A1 * | 4/2005 | Green et al. .................... 705/14 |
| 2005/0102177 | A1 * | 5/2005 | Takayama ....................... 705/14 |
| 2005/0120023 | A1 * | 6/2005 | Wesinger et al. ............... 707/10 |
| 2005/0125354 | A1 * | 6/2005 | Pisaris-Henderson et al. . 705/52 |
| 2005/0131894 | A1 * | 6/2005 | Vuong .............................. 707/5 |
| 2005/0149496 | A1 | 7/2005 | Mukherjee et al. |
| 2005/0223000 | A1 * | 10/2005 | Davis et al. ....................... 707/5 |
| 2005/0257045 | A1 | 11/2005 | Bushman et al. |
| 2006/0036490 | A1 * | 2/2006 | Sagalyn ........................... 705/14 |
| 2006/0069610 | A1 * | 3/2006 | Rossini ........................... 705/14 |
| 2006/0074726 | A1 * | 4/2006 | Forbes et al. ..................... 705/7 |
| 2006/0074853 | A1 | 4/2006 | Liu et al. |
| 2006/0116926 | A1 * | 6/2006 | Chen ............................... 705/14 |
| 2006/0149710 | A1 | 7/2006 | Koningstein et al. |
| 2007/0150466 | A1 | 6/2007 | Brave et al. |
| 2007/0168346 | A1 | 7/2007 | Markanthony et al. |
| 2007/0260448 | A1 | 11/2007 | Lorenzen et al. |
| 2008/0313119 | A1 | 12/2008 | Leskovec et al. |
| 2009/0112857 | A1 | 4/2009 | Tong et al. |
| 2009/0125544 | A1 | 5/2009 | Brindley |
| 2009/0265338 | A1 | 10/2009 | Kraft et al. |
| 2010/0070484 | A1 | 3/2010 | Kraft et al. |

FOREIGN PATENT DOCUMENTS

| | | | |
|---|---|---|---|
| WO | WO 0195586 | * | 12/2001 |
| WO | WO 02/01391 | * | 1/2002 |
| WO | WO 03/021514 | * | 3/2003 |

OTHER PUBLICATIONS

Chinese Office Action received in application serial No. 200680037856.X dated Sep. 7, 2010 (8 pages).

Current Claims of Chinese application serial No. 200680037856.X, Dec. 2010 (5 pages).

Chinese Office Action received in Application serial No. 200580032112.4 dated Oct. 28, 2010 (27 pages).

Current Claims in Application serial No. 200580032112.4, Dec. 2010 (5 pages).

Maglio, P. et al., "LiveInfo: Adapting web experience by customization and annotation". In Proceedings of the 1$^{st}$ International Conference on Adaptive Hypermedia and Adaptive Web-based Systems, AH2000, Trento, Italy, Aug. 2000 (10 pages).

Dumais et al., Optimizing Search by Showing Results in Context, Mar. 31, 2001, ACM, pp. 1-8.

U.S. Appl. No. 10/903,283, filed Jul. 29, 2004, Notice of Allowance, mailing date Mar. 23, 2011.

U.S. Appl. No. 12/553,636, filed Sep. 3, 2009, Office Action, mailing date Jun. 21, 2011.

Sugiyama, Kazunari et al, "Adaptive Web search based on user profile constructed without any effort from users", XP-002434325, international World Wide Web Conference, XX, XX, May 2004, 10 pages.

European Patent Office, "Supplementary European Search Report", application No. EP 05774749, dated Mar. 31, 2009, 7 pages.

Claims, application No. EP 05774749, 9 pages.

U.S. Appl. No. 12/132,071, filed Jun. 3, 2008, Notice of Allowance, mailing date Aug. 18, 2011.

Budzik, et al., "Anticipating Information Needs: Everyday Applications as Interfaces to Internet Information Resources", Proceedings of the 1998 World Conference of the WWW, AACE Press, 1998, 8 pages.

Budzik, et al., "User interactions with Everyday Applications as Context for Just-in-time Information Access", Proceedings of the 2000 International Conference on Intelligent User Interfaces, ACM Press, 2000, 7 pages.

Budzik, et al., "Information Access in Context", Knowledge Based Systems, Sep. 2001, 17 pages.

Budzik, et al., "Supporting on-line resource discovery in the context of ongoing tasks with proactive software assistants", International Journal of Human-Computer Studies, Jan. 2002, 27 pages.

Budzik, et al., "Anticipating and Contextualizing Information Needs", In Proceedings of the Sixty Second Annual Meeting of the American Society for Information Science, Learned Information Inc., 1999, 13 pages.

\* cited by examiner

Yahoo! My Yahoo! Mail

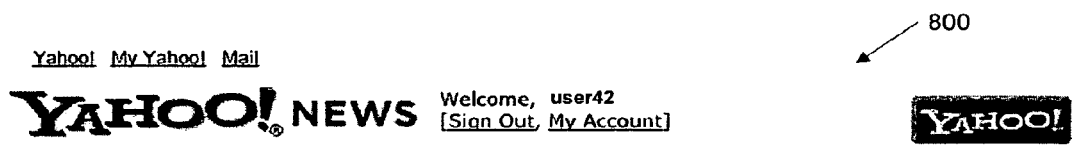

NEWS: Top Stories

Strong Indonesia Quake Forces Evacuations
AP - 28 minutes ago
A major earthquake struck off the west coast of Indonesia's Sumatra Island late Monday, and officials issued a tsunami warning for as far away as Sri Lanka. Residents of Banda Aceh fled their homes in panic. — 802

Full Coverage

Related Results —— 806

SPORTS: Top Stories

Donald Leads Windy Players Championship
AP - 57 minutes ago
Luke Donald waited five days to hold the third-round lead at The Players Championship. Now, he'll try to avoid a fate like Bob Tway's 12 on No. 17's famed island green if he hopes to win golf's "fifth major." — 804

Full Coverage

Related Results —— 808

FIG. 8

```
<div class="yqcontext">
  PGA News: Luke Donald leads The Player's Championship
  <a href="javascript:activateYQ()" class="yqact"></a>           902
  <form class="yq" action="http://yq.search.yahoo.com/search" method="POST">
    <input type="hidden" name="fr" value="4170846GHD3G">
    <input type="hidden" name="sourceOrder" value="s,r,i">           910
    <input type="hidden" name="resultFormat" value="embedded">
    <input type="hidden" name="siteContext" value="Players Championship Golf">
    <input type="hidden" name="siteFocus" value="PGA">                904
    <Qgroup=4379>           906
    <Qcat=437942>
  </form>           908
</div>
```

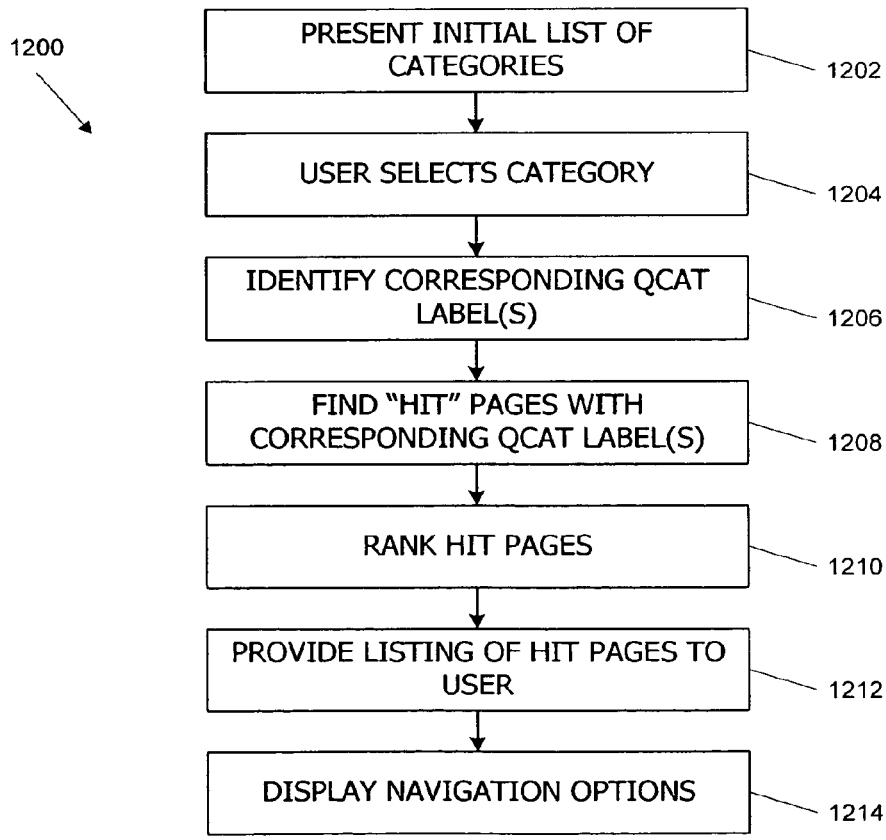

FIG. 12

SYSTEMS AND METHODS FOR PRESENTING ADVERTISING CONTENT BASED ON PUBLISHER-SELECTED LABELS

CROSS-REFERENCES TO RELATED APPLICATIONS

The present application is a continuation of U.S. application Ser. No. 11/232,270 U.S. Pat. No. 7,409,402, entitled SYSTEMS AND METHODS FOR PRESENTING ADVERTISING CONTENT BASED ON PUBLISHER-SELECTED LABELS, filed on Sep. 20, 2005 by Alwin Fei Quen Chan, et al., the contents of which are incorporated herein by reference.

The present disclosure is related to the following U.S. Patents and Patent Applications:

- Application Ser. No. 10/903,283, filed Jul. 29, 2004, entitled "Search Systems and Methods Using In-Line Contextual Queries";
- U.S. Pat. No. 7,856,441, filed Jan. 10, 2005, entitled "Search Systems and Methods with Enhanced Contextual Queries";
- U.S. Pat. No. 7,603,349, filed Jan. 10, 2005, entitled "User Interfaces for Search Systems Using In-Line Contextual Queries"; and
- U.S. Pat. No. 7,421,441, filed of even date herewith, entitled "Systems and Methods for Presenting Information Based on Publisher-Selected Labels."

The respective disclosures of these patents and applications are incorporated herein by reference for all purposes.

BACKGROUND OF THE INVENTION

The present invention relates in general to information delivery systems and methods, and in particular to systems and methods for presenting information based at least in part on publisher-selected labels. The labels are applied to content items by publishers and used to identify related content items in various situations.

The World Wide Web (Web), as its name suggests, is a decentralized global collection of interlinked information—generally in the form of "pages" that may contain text, images, and/or media content—related to virtually every topic imaginable. A user who knows or finds a uniform resource locator (URL) for a page can provide that URL to a Web client (generally referred to as a browser) and view the page almost instantly. Since Web pages typically include links (also referred to as "hyperlinks") to other pages, finding URLs is generally not difficult.

What is difficult for most users is finding URLs for pages that are of interest to them. The sheer volume of content available on the Web has turned the task of finding a page relevant to a particular interest into what may be the ultimate needle-in-a-haystack problem. To address this problem, an industry of search providers (e.g., Yahoo!, MSN, Google) has evolved. A search provider typically maintains a database of Web pages in which the URL of each page is associated with information (e.g., keywords, category data, etc.) reflecting its content. The search provider also maintains a search server that hosts a search page (or site) on the Web. The search page provides a form into which a user can enter a query that usually includes one or more terms indicative of the user's interest. Once a query is entered, the search server accesses the database and generates a list of "hits," typically URLs for pages whose content matches keywords derived from the user's query. This list is provided to the user. Since queries can often return hundreds, thousands, or in some cases millions of hits, search providers have developed sophisticated algorithms for ranking the hits (i.e., determining an order for displaying hits to the user) such that the pages most relevant to a given query are likely to appear near the top of the list. Typical ranking algorithms take into account not only the keywords and their frequency of occurrence but also other information such as the number of other pages that link to the hit page, popularity of the hit page among users, and so on.

To further facilitate use of their services, some search providers now offer "search toolbar" add-ons for Web browser programs. A search toolbar typically provides a text box into which the user can type a query and a "Submit" button for submitting the query to the search provider's server. Once installed by the user, the search toolbar is generally visible no matter what page the user is viewing, enabling the user to enter a query at any time without first navigating to the search provider's Web site. Searches initiated via the toolbar are processed in the same way as searches initiated at the provider's site; the only difference is that the user is spared the step of navigating to the search provider's site.

One technique for helping a user find content is to provide an interface via which the user can request "related" pages. Pages can be identified as related based on similarity of their content to that of the currently viewed page and/or whether the pages are published by the same entity. As implemented in existing systems, neither technique is very reliable.

Existing algorithms for identifying related pages based on similarity of content generally rely on overlap of textual elements (words, phrases, etc.) between the current page and the related page. The "best" matches according to such algorithms have the most overlap with the current page; however, the pages with the most overlap are often least interesting to the user, who typically wants to find pages with different information on the same subject. Determining whether two pages relate to the same subject is a difficult task, as it requires determining the subject of each page, which might or might not be evident from the words used.

Identifying pages published by the same entity is sometimes easier but is of limited help to the user. The publisher's own pages can sometimes be identified by URL, on the assumption that URLs beginning with the same domain name are commonly owned, but this assumption is not always reliable. For instance, some domains host content created by multiple independent publishers, and some publishers use multiple domains. Further domain-name matching does not provide a way to identify affiliates of a publisher, since the affiliates typically use different domains.

Therefore, it would be desirable to provide systems and methods for more efficiently identifying related content.

BRIEF SUMMARY OF THE INVENTION

Embodiments of the present invention provide systems and methods allowing publishers to define relationships between their own content items (e.g., World Wide Web pages) and content items created or maintained by other publishers. A central namespace manager provides referral labels that publishers can insert into their content items. In one embodiment, the referral labels are used to indicate referral relationships between or among publishers. These referral labels are advantageously not displayed when the content item is displayed for a user but are made available to an information server such as a search server, which uses the labels in identifying content items related to a currently displayed content item. For example, in one embodiment, an in-line or pop-up advertisement to be displayed while the user is viewing a target content item are selected based at least in part on matching a referral label included in the target content item to a referral label included in the advertisement. The referral labels can also be used to manage referral-based revenue sharing among various publishers.

According to one aspect of the present invention, a computer implemented method for providing advertisements to a client computer includes defining a number of referral labels. Each referral label is assigned to one of a number of publishers, with different publishers being assigned different referral labels. At least some of the referral labels represent referral relationships between different publishers. A sponsored content database is configured to associate each of a number of advertisements with one of the referral labels, with each advertisement including a link to a content item. An advertising server computer receives a request (originating from a client computer) for an advertisement related to a first content item published by a first one of the publishers; the request includes a first one of the referral labels. The advertising server computer identifies, from the sponsored content database, a first advertisement that is associated with a second referral label, the first advertisement being provided by a second one of the publishers, where the first referral label and the second referral label represent a referral relationship between the first publisher and the second publisher. The first advertisement is transmitted for presentation to a user by the client computer. In the event that a user clickthrough on the first advertisement is reported by the client computer, a referral from the first referral label to the second referral label is logged.

In some embodiments, the first referral label is extracted from the first content item, e.g., from a contextual search code block included in the first content item. The contextual search code block may also include a first context vector representing content of at least a portion of the first content item, and the request for the advertisement may include this context vector. If advertisements in the sponsored content database are each associated with a respective ad context vector, then the first advertisement can be identified by a process that includes identifying candidate advertisements, where each candidate advertisement is associated with a referral label that represents a referral relationship between the first publisher and a publisher of the candidate advertisement, and selecting one of the candidate advertisements as the first advertisement based at least in part on a comparison between the first context vector and the respective ad context vectors associated with the candidate advertisements.

In some embodiments, an accounting server receives the logged referral from the first referral label to the second referral label. The accounting server credits a first referral fee to the first publisher, where the first publisher is identified using the first referral label and also debits the first referral fee from the second publisher, where the second publisher is identified using the second referral label. Revenue credited to the first publisher can also be shared with an "upstream" publisher who is a referrer to the first publisher; for instance, the accounting server can debit a portion of the first referral fee from the first publisher and credit that portion to the upstream publisher.

According to another aspect of the present invention computer-based system for providing advertisements to a client computer includes a sponsored content data store and an advertising server communicably coupled to the sponsored content data store. The sponsored content data store is configured to store advertisements, each of the advertisements being associated with at least one of a number of referral labels. Each referral label is assigned to one of a number of publishers, with different publishers being assigned different referral labels, and the referral labels represent referral relationships between different publishers. The advertising server includes input control logic, selection control logic, output control logic, and logging control logic. The input control logic is configured to receive a request originating from a client computer for an advertisement related to a first content item published by a first one of the publishers, the request including a first one of the referral labels, the first referral label being extracted from the first content item. The selection control logic is configured to identify, from the sponsored content data store, a first advertisement that is associated with a second referral label, the first advertisement being provided by a second one of the publishers, wherein the first referral label and the second referral label represent a referral relationship between the first publisher and the second publisher. The output control logic is configured to transmit the first advertisement for presentation to a user by the client computer. The logging control logic is configured to log a referral from the first referral label to the second referral label in the event that a user clickthrough on the first advertisement is reported by the client computer.

In some embodiments, the system also includes an accounting server coupled to process the logged referrals. Processing of the logged referrals may include crediting a first referral fee to the first publisher, with the first publisher being identified using the first referral label, and debiting the first referral fee from the second publisher, with the second publisher being identified using the second referral label.

In some embodiments, the system also includes a namespace manager configured to generate referral labels in response to requests from publishers. For instance, the first referral label might include a first code identifying the first publisher, and the second referral label might include the first code and also a second code identifying the second publisher. The namespace manager can be configured such that the second referral label is generated in response to an indication of a referral agreement between the first and second publishers.

The following detailed description together with the accompanying drawings will provide a better understanding of the nature and advantages of the present invention.

BRIEF DESCRIPTION OF THE DRAWINGS

FIG. 8 shows an example of a hosting page for a contextual search interface.

FIG. 9 is an example of a code block for a contextual search interface with grouping labels according to an embodiment of the present invention.

FIG. 12 is a flow diagram of a process for providing a browsable directory of content items according to an embodiment of the present invention.

DETAILED DESCRIPTION OF THE INVENTION

Embodiments of the present invention provide systems and methods allowing publishers to define relationships between their own content items (e.g., World Wide Web pages) and content items created or maintained by other publishers. A central namespace manager provides referral labels that publishers can insert into their content items. In one embodiment, the referral labels are used to indicate referral relationships between or among publishers. These referral labels are advantageously not displayed when the content item is displayed for a user but are made available to an information server such as a search server, which uses the labels in identifying content items related to a currently displayed content item. For example, in one embodiment, an in-line or pop-up advertisement to be displayed while the user is viewing a target content item are selected based at least in part on matching a referral label included in the target content item to a referral label included in the advertisement. The referral labels can also be used to manage referral-based revenue sharing among various publishers.

I. Overview

A. Network Implementation

Figure 1:
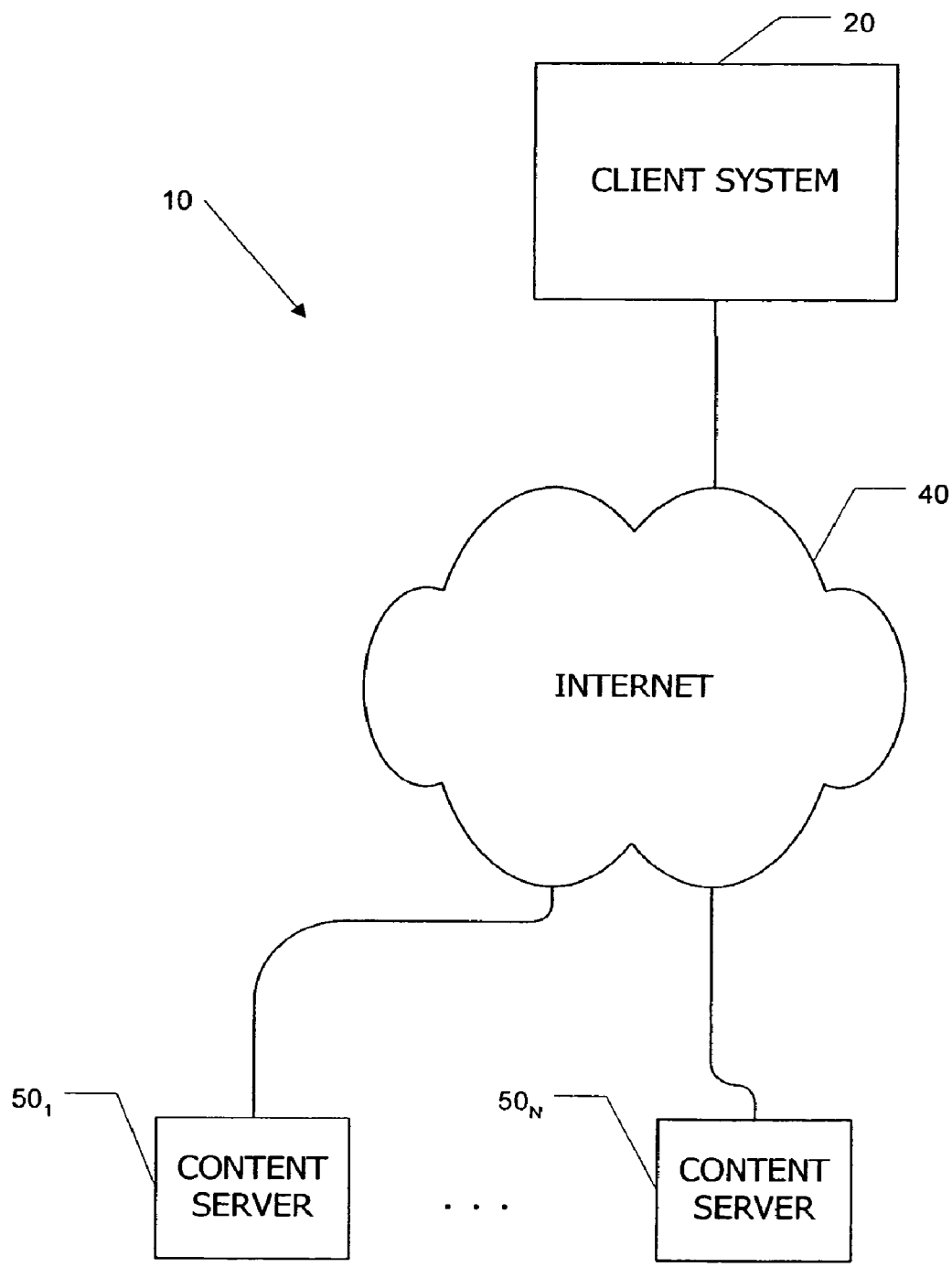
FIG. 1 illustrates a general overview of an information retrieval and communication network according to an embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems $50_1$ to $50_N$. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla Firefox™ browser, Opera™ browser, or a WAP-enabled browser in the case of a cell phone, PDA or other wireless device, or the like, allowing a user of client system 20 to access, process and view information and pages available to it from server systems $50_1$ to $50_N$ over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

B. Information Retrieval System

Figure 2:
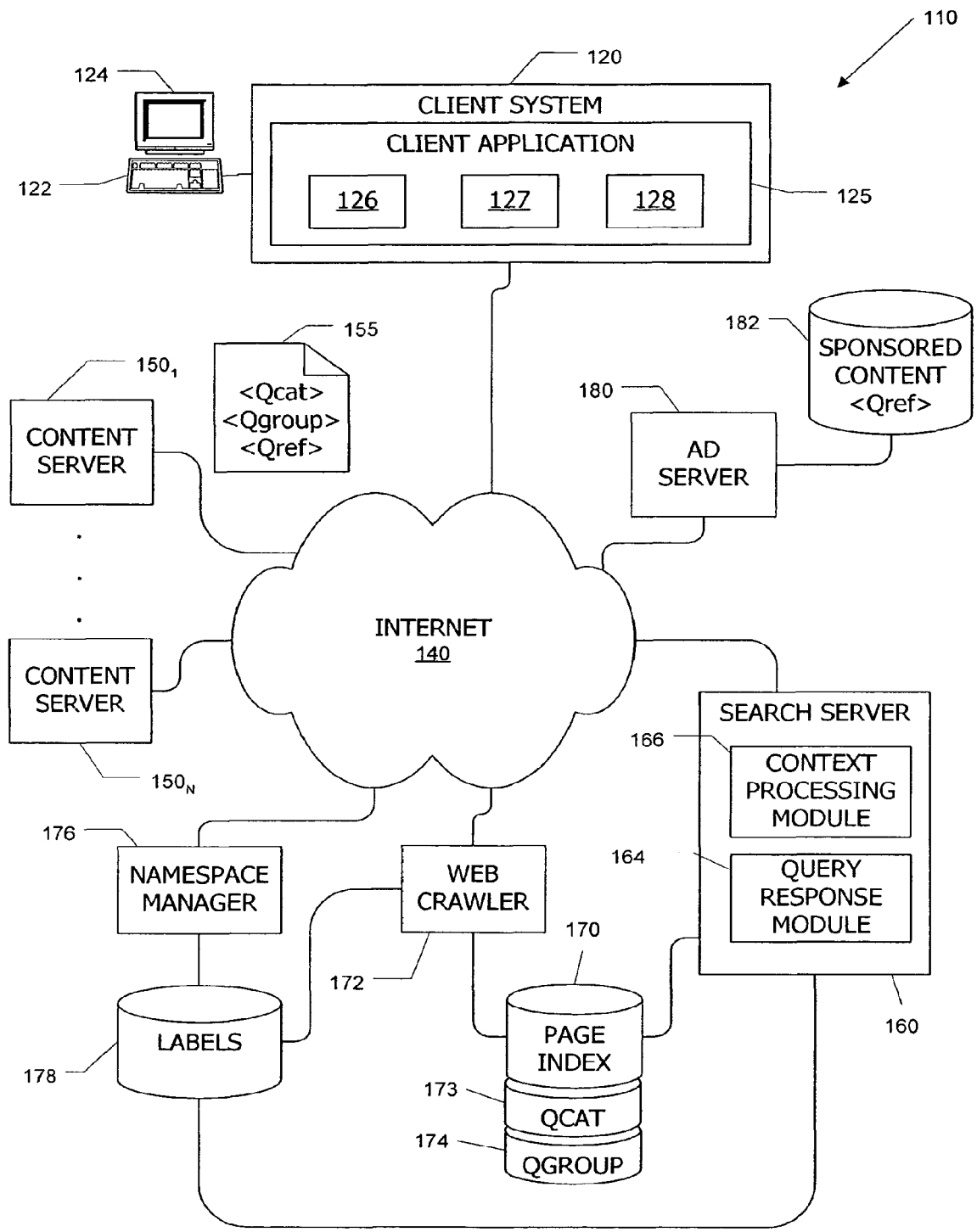
FIG. 2 illustrates another information retrieval and communication network according to an embodiment of the invention.

FIG. 2 illustrates another information retrieval and communication network 110 for communicating information including documents and media content according to an embodiment of the invention. As shown, network 110 includes client system 120, one or more content server systems 150, and a search server system 160. In network 110, client system 120 is communicably coupled through Internet 140 (or other communication network) to server systems 150 and 160. As discussed above, client system 120 and its components are configured to communicate with server systems 150 and 160 and other server systems over Internet 140 or other communication networks.

Content servers $150_1$ to $150_N$ store content items such as content item 155 (e.g., Web pages, images, media files) that can be provided on demand to client system 120 via Internet 140. Content servers $150_1$ to $150_N$ may support various information sharing protocols such as HTTP and/or other known protocols. It is to be understood that any number N of content servers may be present, and each content server may provide any number of content items. Further, client access to some or all of the content items may be limited to authorized users as is known in the art.

Content items are created and stored at content servers $150_1$ to $150_N$ by publishers; as used herein, the term "publisher" refers to any entity (including persons, organizations and/or computer systems) responsible for creating and/or maintaining a content item on any one of content servers $150_1$ to $150_N$. In accordance with an embodiment of the present invention, publishers can select grouping labels such as the "Qgroup," "Qcat," and "Qref" labels shown in content item 155 to be included in their content items. As described below, grouping labels can be provided to the server and/or client systems of FIG. 2 and used to determine which content items are related to each other. In some embodiments, the Qgroup and Qref labels denote an affiliation among publishers of different content items while the Qcat label denotes a subject-matter relationship among content items; other grouping labels may also be used.

In some embodiments, content items such as content item 155 may also include a context vector. The "context vector" may contain any data representative of the content (or of some portion thereof). For instance, a context vector can include a list of terms (words or phrases) appearing in the content item, and each term may have an associated weight based on the term frequency (i.e., number of occurrences of the term in the content item), document frequency (i.e., number of content items in the corpus that contain the term), or the like. Examples of context vectors are described, e.g., in above-referenced application Ser. No. 10/903,283 and application Ser. No. 11/033,100.

1. Client System

According to one embodiment, a client application (represented as module 125) executing on client system 120 includes instructions for controlling client system 120 and its components to communicate with server systems 150 and 160 and to process and display data content received therefrom. Client application 125 may be transmitted and downloaded to client system 120 from a software source such as a remote server system (e.g., server systems 150, server system 160 or other remote server system), or client application module 125 may also be provided on any software storage medium (floppy disk, CD, DVD, etc.) that is readable by client system 120 as discussed above. For example, in one aspect, client application 125 may be provided over Internet 140 to client system 120 in an HTML wrapper including various controls such as, for example, embedded JavaScript or Active X controls, for manipulating data and rendering data in various objects, frames and windows.

Client application module 125 advantageously includes various software modules for processing data and media content. In one embodiment, these modules include a specialized search module 126, a user interface module 127, and an application interface module 128. Specialized search module 126 is configured for processing search requests (also referred to herein as queries) to be sent to search server 160 and search result data received from search server 160.

User interface module 127 is configured for rendering data and media content in text and data frames and active windows, e.g., browser windows and dialog boxes. In some embodiments, user interface module 127 includes or communicates with a browser program, which may be a default browser configured on client system 120 or a different browser. Application interface module 128 is configured to support interfacing and communicating between client application 125 and various other applications executing on client 120, such as e-mail applications, instant messaging (IM) applications, browser applications, document management applications and others.

User interface module 127 advantageously provides user input interfaces allowing the user to enter queries for processing by search server system 160. For example, where user interface module 127 includes or communicates with a browser, the user may be able to enter a URL or activate a control button to direct the browser to a Web search page (or site) from which the user can submit a query to search server system 160 for processing. In addition or instead, user interface module 127 may include a search toolbar or other interface via which the user can enter and submit a query without first navigating to the search page. Queries entered using user interface module 127 may be preprocessed by specialized search module 126 prior to being sent to search server system 160, e.g., to remove so-called "stop words" ("the," "and," etc.), to correct spelling errors, or the like.

In some embodiments, client application 125 may include various features for adding context data (referred to herein as a "context vector") to the user's queries. For example, specialized search module 126 may be configured to generate context vectors based on content the user is currently viewing at the time a query is entered. As another example, in some embodiments of the present invention, Web pages displayed in the browser may include one or more context vectors that can be used to supplement user-entered queries. User interface module 127 may be configured to detect such context vectors in a page being displayed and use context vector data to supplement a query entered by the user.

2. Search Server System

According to one embodiment of the invention, search server system 160 is configured to provide search result data and media content to client system 120, and content server systems $150_1$ to $150_N$ are configured to provide data and media content such as web pages to client system 120, for example, in response to links selected by the user in search result pages provided by search server system 160. In some variations, search server system 160 returns content as well as, or instead of, links and/or other references to content.

Search server system 160 references various page indexes 170 that are populated with, e.g., pages, links to pages, data representing the content of indexed pages, etc. Page indexes may be generated by various collection technologies such as an automatic web crawler 172; in addition, manual or semi-automatic classification algorithms and interfaces may be provided for classifying and ranking web pages within a hierarchical category structure. Such technologies and algorithms may be of generally conventional design, and a detailed description is omitted as not being critical to the present invention.

In one embodiment, an entry in page index 170 includes a search term, a reference (e.g., a URL or other encoded identifier) to a page in which that term appears and a context identifier for the page. The context identifier may be used for grouping similar results for search terms that may have different meanings in different contexts. For example, the search term "jaguar" may refer to the British automobile, to an animal, to a professional football team, and so on. The context identifier for a page can be used to indicate which of these contexts is applicable. In one embodiment, the context identifier includes a category for the page, with the category being assigned from a predefined hierarchical taxonomy of content categories. A page reference may be associated with multiple context identifiers, so the same page (or a link thereto) may be displayed in multiple contexts. In some embodiments, context identifiers are automatically associated with page links by the system as users perform various searches; the identifiers may also be modified and associated with-links manually by a team of one or more index editors.

Page index 170 may also store the grouping label(s), if any, included in the page, allowing the corpus to be searched by grouping label. As described below, in some embodiments, one or more indices that index the corpus by grouping label are also created; Qcat index 173 is an index of pages by Qcat label, and Qgroup index 174 is an index of pages by Qgroup label. In other embodiments, page index 170 can be searched by Qcat label and/or Qgroup label, and building a separate Qcat index and/or Qgroup index is not required.

Search server system 160 is configured to provide data responsive to various search requests received from a client system 120, in particular from search module 126 and/or user interface module 127. For example, search server system 160 may include a query response module 164 that is configured with search related algorithms for identifying and ranking Web pages relative to a given query, e.g., based on a combination of logical relevance (which may be measured by patterns of occurrence of search terms in the query), context identifiers, page sponsorship, etc.

In some embodiments, query response module 164 is also configured to receive and make use of context vector data that may be provided in association with a query in order to further enhance the response to queries. Query response module 164 may also enhance search result information with additional information (e.g., links and/or advertising copy) obtained from a sponsored content database 182. Sponsored content database 182 may be implemented as part of page index 170 by the inclusion of additional fields in each entry to identify page references that are sponsored and keywords for triggering the display of sponsored content, or it may be implemented in a separate database. In some embodiments, sponsored contend database 182 includes a grouping label (e.g., a Qref label) associated with each information item stored therein. The Qref label can be used in selecting sponsored content items to be included in a content item (e.g., item 155) as described below.

In some embodiments, search server 160 also includes a context processing module 166 that is configured with various algorithms for processing received content to generate a context vector representative of the received content. In general, a context vector may include any data that represents all or part of the content. For example, one embodiment of a context vector for text content may include keywords such as terms (e.g., words or phrases) that appear in the content, and each such term may have an associated frequency count or a weight based on term frequency (the number of times the term occurs in the received content) and/or document frequency (e.g., the number or fraction of documents in the corpus that contain that term) and/or other parameters reflecting the likelihood that a particular term is a reliable indicator of context. Other types of data may also be included, e.g., URLs or other data identifying any links that may be included in the content, the URL or other identifier of the page that contains the content, category data associated with the content or with a page that contains the content, and so on.

3. Labeling and Indexing System

As noted above, content item 155 and other content items can include grouping labels. As used herein, a "grouping label" includes any piece of data (e.g., an alphanumeric string or numerical value) that can be inserted into a document by a publisher and recognized by various servers as indicating that the document belongs to a group of related documents. In preferred embodiments, the grouping label is included in an HTML tag or other control structure so that it is detectable by suitably configured computer systems but does not appear in the displayed page.

Grouping labels can be used to indicate various relationships that can exist between content items. For instance, two documents addressing the same subject matter might be considered related, as might two documents produced by the same publisher, two documents produced by affiliated publishers, and so on. In some embodiments, multiple classes of grouping labels are supported, allowing different types of relationships to be defined.

For purposes of the present description, three classes of grouping labels, referred to herein as Qcat, Qgroup, and Qref labels, are used. A "Qcat" label is a label indicative of the subject matter of the document. In some embodiments, a hierarchical taxonomy of category names is defined, and each node in the taxonomy is assigned a unique Qcat label. The publisher of a particular content item selects a suitable category name from the taxonomy and includes the corresponding Qcat label in the content item. All content items containing a particular Qcat label are presumed to be related to each other by subject matter.

A "Qgroup" label is a label that indicates a personal or professional affiliation between publishers of different documents. In some embodiments, a publisher (referred to herein as a "founding" publisher) who wants to be affiliated with other publishers creates a unique Qgroup label. The founding publisher includes this Qgroup label in its own content items and invites other publishers to include the same Qgroup label in their items as well. All content items containing a particular Qgroup label are presumed to be affiliated with each other, (i.e., produced by publishers who have an affiliation with each other), and therefore related to each other.

A "Qref" label is similar to a Qgroup label in that it also indicates an affiliation among publishers. In the case of the Qref label, the affiliation is a referral relationship in which a first publisher agrees to refer visiting users to content provided by a second publisher, e.g., by including in the first publisher's content items advertisements with links to the second publisher's content items. Items containing related Qref labels are presumed to be related to each other (i.e., produced by publishers who have a referral relationship). In addition, where referral relationships are established in exchange for financial consideration, the Qref labels can be used to determine amounts of money owed by one publisher to another. Qref labels are described further in Section IV below.

It is to be understood that the classes of grouping labels used herein are illustrative and not limiting. Other classes of grouping labels (e.g., by author, by type of content, etc.) could also be supported in addition to or instead of those used in the examples herein. Further, it is to be understood that only one class of grouping labels might be used, with different types of relationships not being distinguished.

To facilitate consistent use of grouping labels across publishers and content items, each label namespace is advantageously subject to centralized management. In some embodiments, a namespace manager 176 is communicably connected to Internet 140. Namespace manager 176 maintains a labels data store 178 that stores a list of valid grouping label values for each recognized class of grouping labels. Namespace manager 176 communicates, via Internet 140, with publishers of content distributed via content servers $150_1$ to $150_N$, allowing the publishers to select grouping labels for inclusion in their content items. In some embodiments, namespace manager 176 can create new grouping labels in response to publisher requests; in other embodiments, namespace manager 176 provides grouping labels from a predefined list.

Further, as described below, namespace manager 176 may also be configured to validate any grouping labels found in content items, e.g., in response to requests from web crawler 172 and/or search server 160. For instance, when web crawler 172 detects a grouping label in a Web page, the value of the detected grouping label may be checked against the list of valid values in labels data store 178. Invalid grouping-label values are advantageously not recorded in page index 170, Qgroup index 174, or Qcat index 173.

4. Ad Server System

In some embodiments, system 110 also includes an advertisement (ad) server 180 coupled to Internet 140. Ad server 180 has access to a sponsored content database 182 that stores references to content items that can be displayed as advertisements (e.g., banner ads or pop-ups or the like) while the user views a related content item. In some embodiments, each entry in sponsored content database 182 can have one or more grouping labels associated with it, and ads to be displayed while the user views a given content item are selected using the grouping labels, as described below.

It will be appreciated that the search system described herein is illustrative and that variations and modifications are possible. Any of the various systems, including content server, search server, web crawler, namespace manager, and/or ad server, may be part of a single organization, e.g., a distributed server system such as that provided to users by Yahoo! Inc., or they may be part of disparate organizations. Each server system generally includes at least one server and an associated database system, and may include multiple servers and associated database systems, and although shown as a single block, may be geographically distributed. For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably. Further, servers described as separate may be implemented on the same computer system or on different computer systems.

The search server system may be configured with one or more page indexes and algorithms for accessing the page index(es) and providing search results to users in response to search queries received from client systems. The search server system might generate the page indexes itself, receive page indexes from another source (e.g., a separate server system), or receive page indexes from another source and perform further processing thereof (e.g., addition or updating of the context identifiers and/or grouping labels).

II. Labeling Content Items

In accordance with an embodiment of the present invention, publishers can label their Web pages (or other content items) with grouping labels that are usable to associate pages with each other. As described above, various classes of grouping labels can be used to represent different relationships, e.g., Qcat labels for related subject matter and Qgroup labels for affiliated publishers. The grouping labels selected by the publisher are included in the content items and can be detected by web crawler 172, search server 160 and other systems; thus, information about which pages include which grouping labels can be used in a variety of ways for selecting information to present to a user. This section describes processes for selecting grouping label(s) to include in a content item. Examples of using grouping labels to select information for presentation to a user are described below.

A. Publisher Affiliations: Qgroup Labels

In some embodiments of the present invention, the available grouping labels include a Qgroup label that represents a personal or professional or affiliation among publishers. Using the Qgroup label, publishers can identify their content items as being provided by mutually affiliated publishers.

Qgroup labels are advantageously managed by namespace manager 176. In one embodiment, namespace manager 176 creates a Qgroup label in response to a request from a first publisher, referred to herein as a "founding" publisher. Once a Qgroup label is created, other publishers may use that label at the invitation of the founding publisher. Any number of Qgroup labels may coexist, and labels data store 178 advantageously includes a list of Qgroup labels, their founding publishers, and other publishers who have been invited by the founding publisher. In some embodiments, additional metadata about each Qgroup label may also be stored in labels data store 178.

Figure 3:
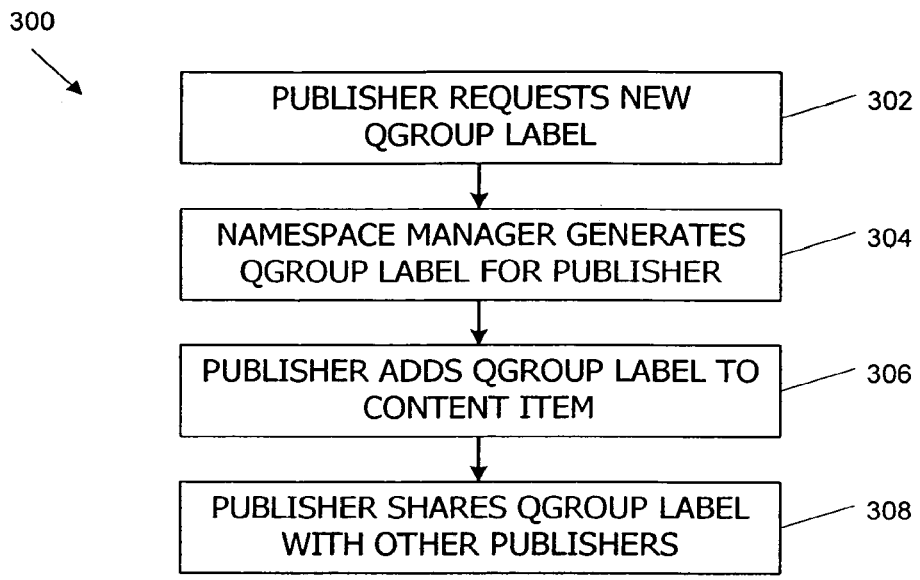
FIG. 3 is a flow diagram of a process for managing grouping labels according to an embodiment of the present invention.

FIG. 3 is a flow diagram of a process 300 for managing Qgroup labels according to an embodiment of the present invention. At step 302, a founding publisher requests a new Qgroup label, e.g., by communicating with namespace manager 176 (FIG. 2). During this communication, the founding publisher establishes its identity and provides a URL, domain name, or other identifier for at least one content item that will include the new Qgroup label. At step 304, namespace manager 176 generates a new Qgroup label and provides the label to the founding publisher. The new label may have any value that is not already in use, so that each Qgroup has a unique label. At step 306, the founding publisher adds the Qgroup label to one or more of its content items.

At step 308, the founding publisher shares the Qgroup label with one or more other publishers. In one embodiment, the Qgroup label is a numerical value, and the founding publisher may provide the Qgroup label directly to other publishers. These other publishers can "join" the group by including the Qgroup label in their own content items. In some embodiments, publishers may be limited to one Qgroup label per content item; in other embodiments, a content item might include multiple different Qgroup labels.

In other embodiments, Qgroup labels might be encoded to ensure that the use of the label by other publishers has been approved by the founding publisher. For instance, each publisher might be given a different, but related, Qgroup label, each of which is separately validated. In one such embodiment, at step 304, the founding publisher receives a first Qgroup label that has a base portion and a publisher-specific portion. At step 308, the founding publisher communicates with namespace manager 176 to issue an invitation to another publisher to obtain a related Qgroup label for inclusion in its own pages. The invitation may be communicated to the other publisher by e-mail or any other suitable channel. If the other publisher accepts, namespace manager 176 generates a second Qgroup label that has the same base portion as the first Qgroup label but a different publisher-specific portion. For purposes of identifying related pages (e.g., as described below), Qgroup labels are considered the same if the base portions are the same. For purposes of validating a Qgroup label, labels data store 178 maintains a list of recognized publisher-specific portions for each base Qgroup label, and a Qgroup label is valid only if the combination of base portion and publisher-specific portion is recognized. Other schemes for regulating which publishers can use a Qgroup label may also be used.

As described below, after the Qgroup labels have been included in the Web pages (or other content items) published by affiliated publishers, these labels can be detected and used to identify the pages having the same Qgroup label (or at least the same base portion) as being related to each other.

In some embodiments, other publishers are allowed to join an existing group by adding the Qgroup label to their content items without an explicit invitation from the founding publisher. Where this is the case, namespace manager 176 advantageously provides metadata about existing groups that enables a publisher to make an informed selection. For instance, when a new Qgroup label is created, the founding publisher can supply a description of a "theme" for the group (e.g., cat breeders, wine enthusiasts, etc.). The theme is stored as metadata, and other publishers can search for Qgroup labels for their content based on theme. In some embodiments, the founding publisher may select between an "open" (any publisher can join) or "closed" (only publishers invited by the founding publisher can join) policy for the label, and namespace manager 176 implements the selected policy.

In another embodiment, namespace manager 176 can infer metadata about a group. For instance, a "theme" for the group can be inferred by analyzing the content of different pages having the same Qgroup label. For this purpose, namespace manager 176 might access Qgroup index 174 to identify such pages.

It is not required that all of a publisher's content items include the same Qgroup label. For instance, a publisher that publishes content in several unrelated areas might prefer to have different content items be affiliated with different groups of publishers.

B. Subject Matter Associations: Qcat Label

In other embodiments of the present invention, the available grouping labels include a Qcat label that represents a subject-matter category of a content item. Using the Qcat label, publishers can identify, by category, the subject matter of their content items. As described below, Qcat labels can be detected and used to identify pages having the same Qcat label as being related to each other.

Qcat labels are advantageously managed by namespace manager 176. In one embodiment, a team of human editors generates a taxonomy of category names. This taxonomy may be hierarchical; in one embodiment, the taxonomy is generally similar to the existing Yahoo! directory. Where a taxonomy of context identifiers is used to categorize pages during web crawling operations, as described above, the same taxonomy may also be used for the category names. Namespace manager 176 defines a Qcat label corresponding to each category name and stores the Qcat labels and associated category names in data store 178. Publishers can interact with namespace manager 176 to view (or browse) the taxonomy of category names and select the one that best describes a particular content item. Namespace manager 176 provides the Qcat label corresponding to the selected category name, and the publisher includes the Qcat label in the content item.

Figure 4:
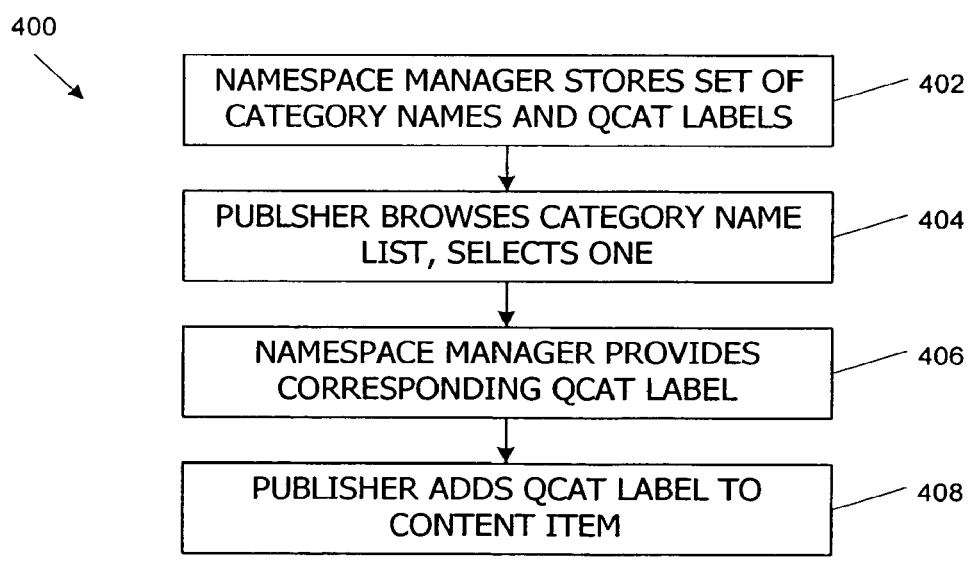
FIG. 4 is a flow diagram of a process managing grouping labels according to another embodiment of the present invention.

FIG. 4 is a flow diagram of a process 400 for adding Qcat labels to content items according to an embodiment of the present invention. At step 402, namespace manager 176 stores a set of category names and associated Qcat labels. As described above, the category names can be provided by human editors. In other embodiments, a hierarchical taxonomy might be automatically generated by wholly or partially automated analysis of language patterns in documents and/or search queries and/or other texts.

At step 404, a publisher communicates with namespace manager 176 to view the taxonomy of category names. Communication may take place via HTTP requests from the publisher for a document containing all or part of the taxonomy. Namespace manager 176 transmits the requested document, e.g., as an HTML form the publisher can use to select a category. In some embodiments, one document includes the entire taxonomy; in other embodiments, multiple interlinked documents are used. In some embodiments, a search interface is provided via which the publisher can enter keywords and retrieve a list of categories corresponding to those keywords. The publisher browses the taxonomy and selects a category name. The selected name is transmitted to namespace manager 176.

At step 406, namespace manager 176 provides to the publisher the Qcat label corresponding to the selected category name. At step 408, the publisher includes the Qcat label in the content item.

It will be appreciated that the process described herein is illustrative and that variations and modifications are possible. Steps described as sequential may be executed in parallel, order of steps may be varied, and steps may be modified or combined. In one alternative embodiment, the publisher provides to namespace manager 176 a content item to be categorized. Namespace manager 176 executes a text-processing algorithm to select one or more suggested categories for the content item, e.g., based on an analysis of terms appearing in the content item. These suggestions are presented to the publisher, who can select one or reject them all and select a different category, e.g., by browsing the taxonomy starting from one of the suggested categories.

In some embodiments, only one Qcat label per content item is supported. In other embodiments, multiple Qcat labels might be supported. For instance, if a Web page contains sections related to several different subjects (as is often the case for news pages, web logs (blogs) and the like), it might be desirable to include a different Qcat label for each section.

As described below, after the Qcat labels have been included in the Web pages (or other content items) by the publishers thereof, these labels can be detected and used to identify the pages in which they appear as being related to each other.

III. Applications of Grouping Labels

Figure 5:
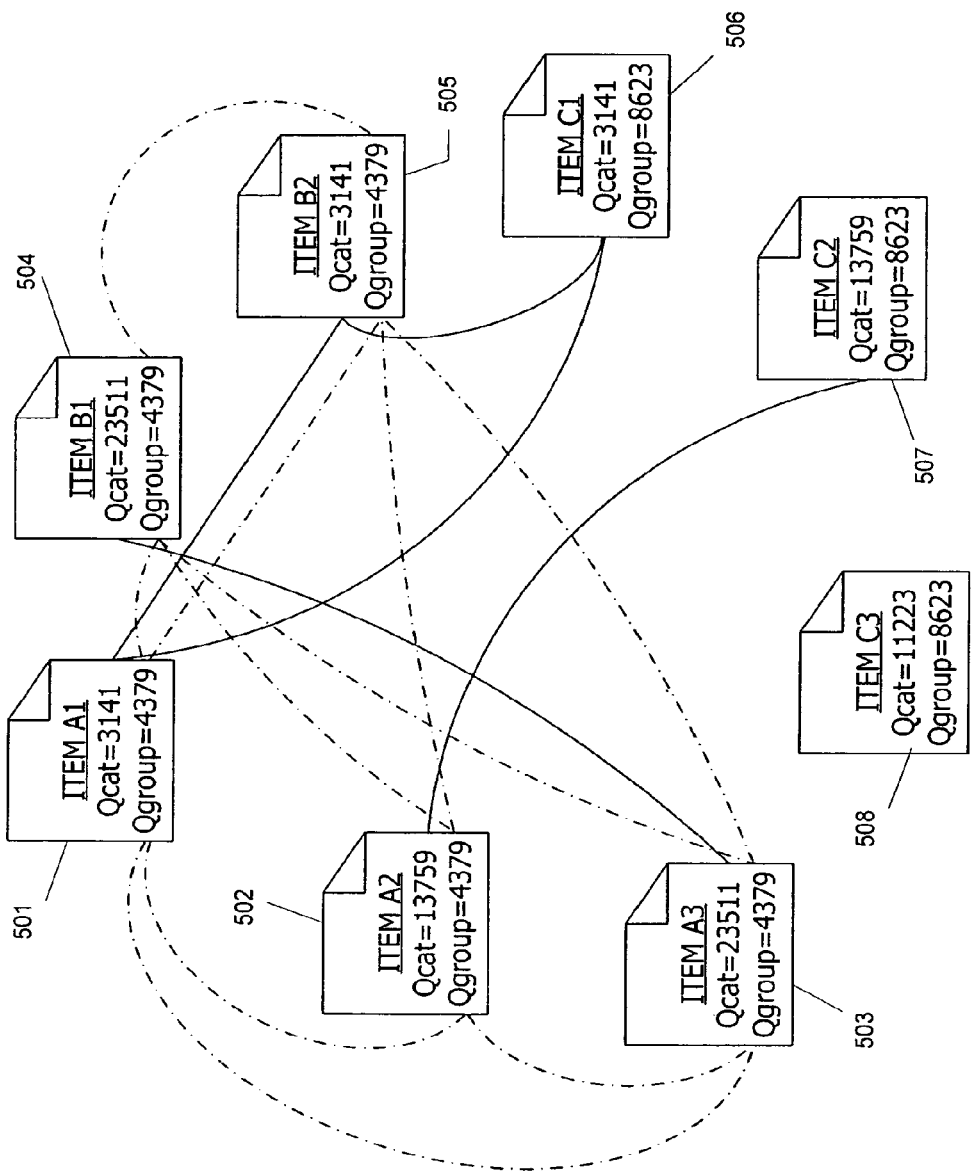
FIG. 5 is a relationship diagram illustrating relationships among content items according to an embodiment of the present invention.

Grouping labels are used to define relationships among content items. By way of illustration, FIG. 5 is a relationship diagram illustrating relationships among content items according to an embodiment of the present invention. In this example, three publishers (A, B and C) have created content items. Publisher A has created content items 501 (Item A1), 502 (Item A2), and 503 (Item A3); publisher B has created content items 504 (Item B1) and 505 (Item B2); and publisher C has created content items 506 (Item C1), 507 (Item C2) and 508 (Item C3). It is to be understood that content items 501-508 may be published via any combination of content servers $150_1$ to $150_N$ (FIG. 2).

Each content item 501-508 includes a Qcat label that was selected by the publisher of that item, e.g., in accordance with process 400 described above. Items with the same Qcat label are regarded as being related in the sense that such items pertain to similar subject matter. Thus, as indicated by the solid lines connecting pairs of related items, items 501, 505 and 506 (all having Qcat=3141) are related, and items 502 and 507 (both having Qcat=13759) are related.

Further, each content item 501-508 includes a Qgroup label selected by the publisher. In this example, publisher A is the founding publisher for a Qgroup label (Qgroup=4379) that has been shared to publisher B. Publisher A's items 501-503 and publisher B's items 504-505 have each been labeled with the same Qgroup label. Items with the same Qgroup label are regarded as being related in the sense that there is some affiliation between the publishers of those items. Thus, as indicated by the broken lines connecting pairs of related items, items 501-505 are all related to each other. Publisher C is not affiliated with publishers A and B, and items 506-508 are not related by Qgroup to any of the other items shown. It is to be understood that the Qgroup label in publisher C's items 506-508 might be shared with other publishers (not explicitly represented in FIG. 5).

As FIG. 5 shows, use of grouping labels allow publishers to define relationships (e.g., content-based or affiliation-based relationships) among content items by voluntarily including grouping labels in their own content items. In the embodiments described herein, publishers do not label other publishers' content and might not know whether or how content items of other publishers have been labeled.

To the extent that the same grouping labels are included in different content items, relationships among content items are established. The grouping label information is advantageously harvested and used to identify related content to present to users, as will now be described.

A. Collecting Relationship Data

In some embodiments, the grouping labels are included as tokens (e.g., HTML tags or other control structures) in the content item. The tokens are advantageously formatted so as not to affect the display of the content item. In some embodiments, however, the tokens are detectable as grouping labels by web crawler 172 (FIG. 2) as it processes Web pages. In some embodiments, web crawler 172 communicates with labels data store 178 (e.g., directly or via namespace manager 176) to verify that any purported grouping labels detected in content items are valid (i.e., within the set of grouping labels defined and managed by namespace manager 176).

Figure 6:
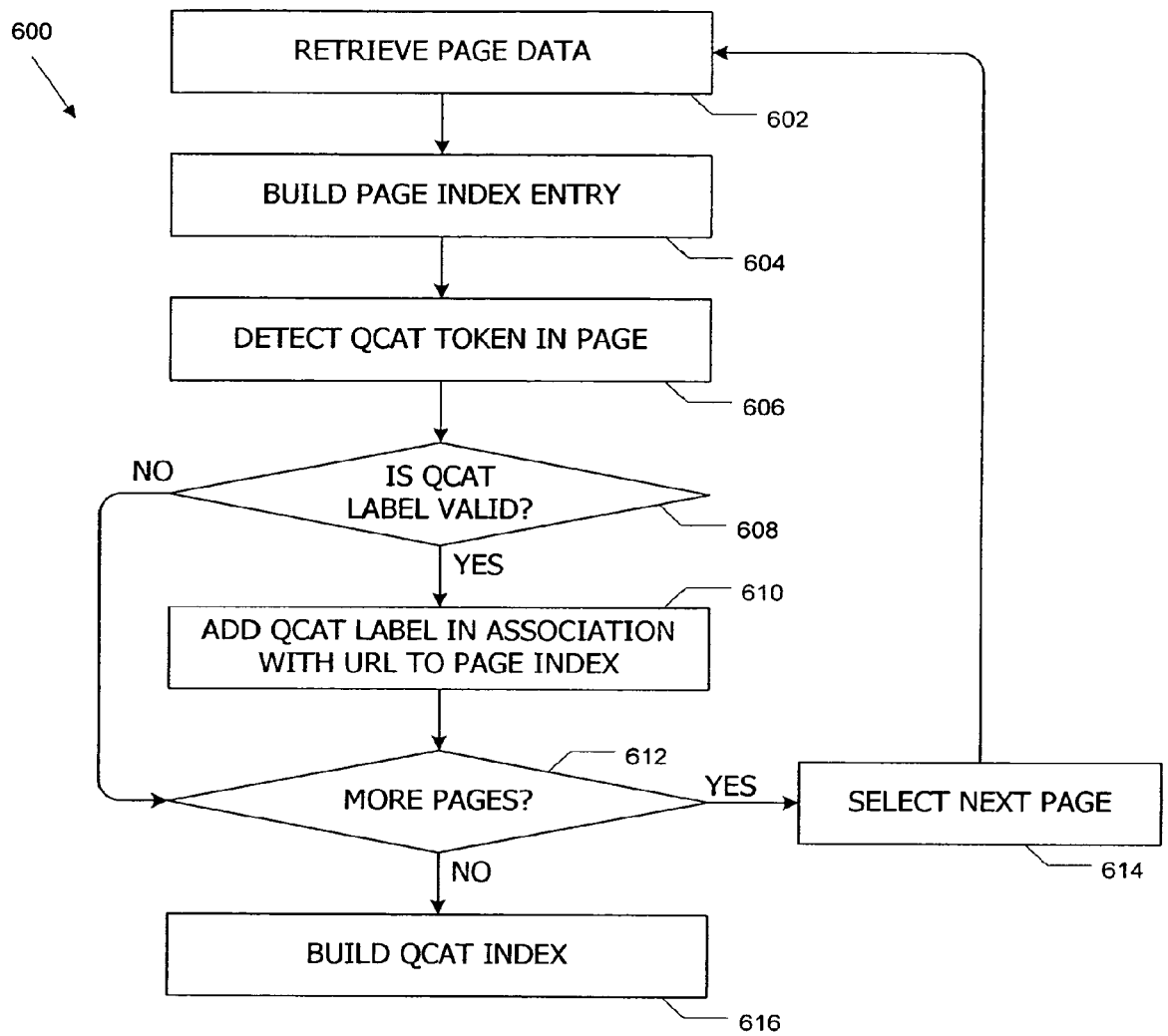
FIG. 6 is a flow diagram of a process for generating an index of pages organized by grouping label according to an embodiment of the present invention

FIG. 6 is a flow diagram of a process 600 that may be implemented in web crawler 172 to generate Qcat index 173 (an index of pages organized by Qcat label) according to an embodiment of the present invention. At step 602, web crawler 172 retrieves the data for a Web page. A starting page for the crawling operation may be selected and retrieved using conventional web-crawling algorithms. At step 604, web crawler 172 builds an entry for page index 170 describing the current page; step 604 may include performing conventional operations to tokenize the page content, generate a compact representation of the text for inclusion in page index 170, and the like.

At step 606, web crawler 172 detects a Qcat label in the page. In preferred embodiments, a Qcat label may appear anywhere within a page, and a page may contain multiple Qcat labels. Web crawler 172 is advantageously configured to detect any number of Qcat labels per page, regardless of where they appear. At step 608, web crawler 172 determines whether the Qcat label is valid, e.g., by consulting labels data store 178. If the Qcat label is valid, then at step 610, the Qcat label is added to the page index entry for the current page. The Qcat label is advantageously in a separate field from other information in the entry. Where a page includes multiple Qcat labels, each Qcat label is added to the page index entry.

At step 612, web crawler 172 determines whether more pages remain to be processed. If so, the next page is selected at step 614 (e.g., using conventional techniques), and process 600 returns to step 602 to process the next page.

After all pages have been processed, at step 616, web crawler 172 builds Qcat index 173, which lists pages containing each valid Qcat label, e.g., by inverting page index 170. In some embodiments, some valid Qcat labels might not be included in any pages, and Qcat index 173 is advantageously arranged such that the absence of pages corresponding to a particular label is correctly handled.

It will be appreciated that the process described herein is illustrative and that variations and modifications are possible. Steps described as sequential may be executed in parallel, order of steps may be varied, and steps may be modified or combined. In addition, a similar process can be used to generate Qgroup index 174 (of FIG. 2) or an index keyed to any other grouping label. In some embodiments, multiple indices are generated in parallel as web crawler 172 operates. Alternative techniques for collecting grouping label data are described below.

B. Use of Grouping Labels in General Search

In some embodiments, grouping labels are used in processing search queries submitted by users. For example in the embodiment of FIG. 2, a client system 120 may transmit a search query to search server 160. Query response module 164 of search server 160 accesses page index 170 to generate a response to the query. The response generally includes a list of "hits," i.e., references to pages that include terms from the search query. The hits are ranked, e.g., based on some measure of logical relevance to the query, and the ranked list of hits is formatted into a search report that is transmitted to client system 120. In accordance with an embodiment of the present invention, search server 160 may enhance the generally conventional query processing techniques implemented in query response module 164 by using grouping labels during the identification and/or ranking of search hits.

For example, in some embodiments where Qcat labels are used, search server 160 matches the search query to a Qcat label, then identifies "category-matching" pages based on Qcat index 173. The category-matched pages can be presented as a separate list of hits, or information about which hits are also category-matched pages can be used in ranking the hits found in a conventional search.

Figure 7:
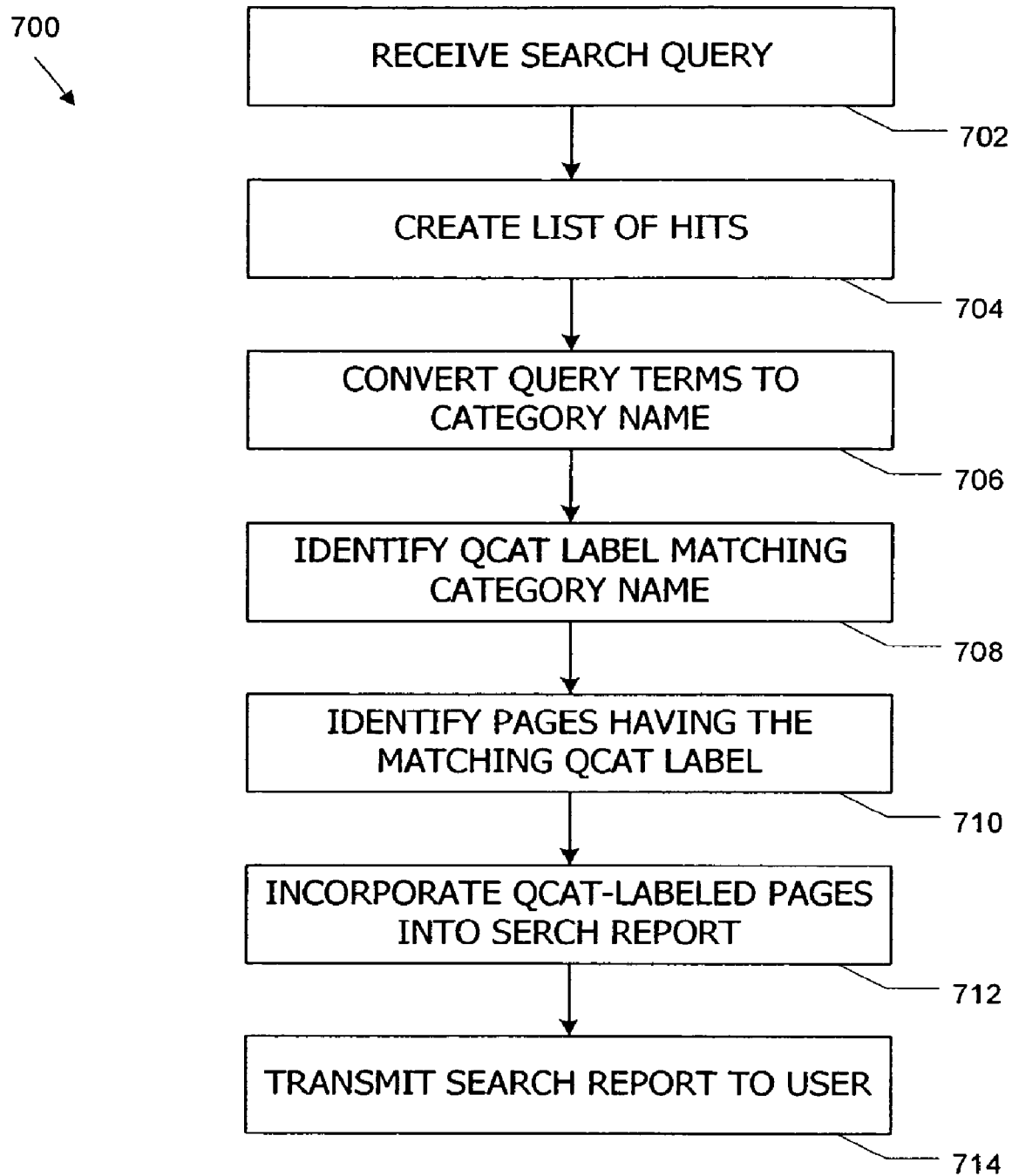
FIG. 7 is a flow diagram of a process for responding to a search query according to an embodiment of the present invention.

FIG. 7 is a flow diagram of a process 700 for responding to a query that may be implemented in search server 160 according to an embodiment of the present invention. At step 702, search server 160 receives a search query including one or more query terms. At step 704, search server 160 creates a list of hits, e.g., by operating query response module 164 to identify hits from page index 170 and rank the hits.

At step 706, search server 160 converts one or more of the query terms to a category name selected from the taxonomy of categories stored in labels database 178. Various algorithms known in the art, including text-string matching algorithms or the like, may be used to match query terms to a category name. At step 708, search server 160 identifies a Qcat label that matches the category name, e.g., by reference to labels data store 178. At step 710, search server 160 identifies "category-matching" pages, i.e., pages that include the matching Qcat label. Step 710 may include consulting Qcat index 173 or page index 170 using the Qcat label as a key.

At step 712, search server 160 incorporates the category-matching pages into the search report. Incorporation may take various forms. In one embodiment, search server 160 ranks the Qcat-matching pages (e.g., based on occurrence of the query terms therein) and provides a separate listing of "category" results in addition to the conventional list of hits. In another embodiment, search server 160 determines whether any of the Qcat-matching pages correspond to the hits and uses that information to rerank the pages, e.g., by boosting the ranking of hits that are also Qcat-matching pages. At step 714, the search result is transmitted to the user.

It will be appreciated that process 700 is illustrative and that variations and modifications are possible. Steps described as sequential may be executed in parallel, order of steps may be varied, and steps may be modified or combined. In some embodiments, not all search queries can be matched to a category name, e.g., due to ambiguity or limitations of the matching algorithm. Where a match is not possible, steps 708, 710 and 712 might be omitted. In some embodiments, where the search query can be matched to multiple category names, the user might be prompted to select the category that best represents the desired information.

In other embodiments, an initial search report is presented to the user without category matching; the search report page includes a section listing the category names of one or more possible matching categories (selected as in step 706 of process 700) and suitable prompts inviting the user to explore one or more of these categories. When the user selects a category, search server 160 responds with a list of category-matching pages, generated, e.g., in accordance with steps 708, 710 and 712 of process 700.

In still other embodiments, when the user submits a query to search server 160, search server 160 initially responds with a listing of hits that is generally conventional except that for each hit that includes a grouping label (e.g., Qcat or Qgroup label), the listing includes a control that the user can operate to view related content. When the user activates this control, the related content can be selected based on the grouping labels included in the hit, e.g., in accordance with steps 710 and 712 of process 700.

C. Use of Grouping Labels in a Contextual Search

In some embodiments, grouping labels are integrated with contextual search interfaces. A contextual search interface is associated with a specific Web page or portion of a Web page. The contextual search interface can appear as an icon in a Web page (referred to herein as a "hosting page") in association with some or all of the page content. The user can activate the icon to view related content and/or execute a search using a user-supplied query together with a context vector representing the content. A detailed description of contextual search interfaces can be found in above-referenced application Ser. No. 10/903,283, application Ser. No. 11/033,100, and application Ser. No. 11/033,417.

By way of illustration, FIG. 8 shows an example of a hosting page 800 that includes content items 802, 804, as it might appear when displayed on client system 120 of FIG. 2. A contextual search ("Related Results") icon 806, 808 is placed near each content item 802, 804. Each icon 806, 808 corresponds to a contextual search interface in an inactive state. The interface is brought to an active state when the user activates it, e.g., by clicking on the icon using a conventional mouse or other pointing device.

Icons 806, 808 are advantageously generated using suitable code blocks in the source code for page 800. FIG. 9 is an example of a code block 900 for a contextual search interface with grouping labels according to an embodiment of the present invention. The code block includes, among other things, a hyperlink 902 that invokes a script to activate the icon (an activated icon is described below), a context vector 904, a Qgroup label 906 and a Qcat label 908. Qgroup label 906 and Qcat label 908 are advantageously generated as described above and inserted into code block 900 at the direction of the publisher of the page that includes code block 900. Also included is a customization ("sourceOrder") tag that is set by the publisher to indicate which types of information should be included in the active contextual search interface. In this embodiment, value "s" denotes suggested search queries, value "r" denotes related content (described below), and value "i" denotes an interface for submitting user-created contextual queries. These values are illustrative, and other values could be substituted.

Referring again to FIG. 8, a user who is interested in information related to a content item on page 800 (e.g., content item 804) selects the corresponding contextual search icon 808, e.g., by clicking on it using a conventional mouse. When contextual search icon 808 is selected, it is activated to provide a contextual search interface. Activation of icon 808 advantageously includes sending an information request, including at least part of contextual search interface code block 900 (FIG. 9), to search server 160 of FIG. 2. Search server 160 responds by providing to client application 125 various information items that can be displayed in a contextual search overlay.

Figure 10:
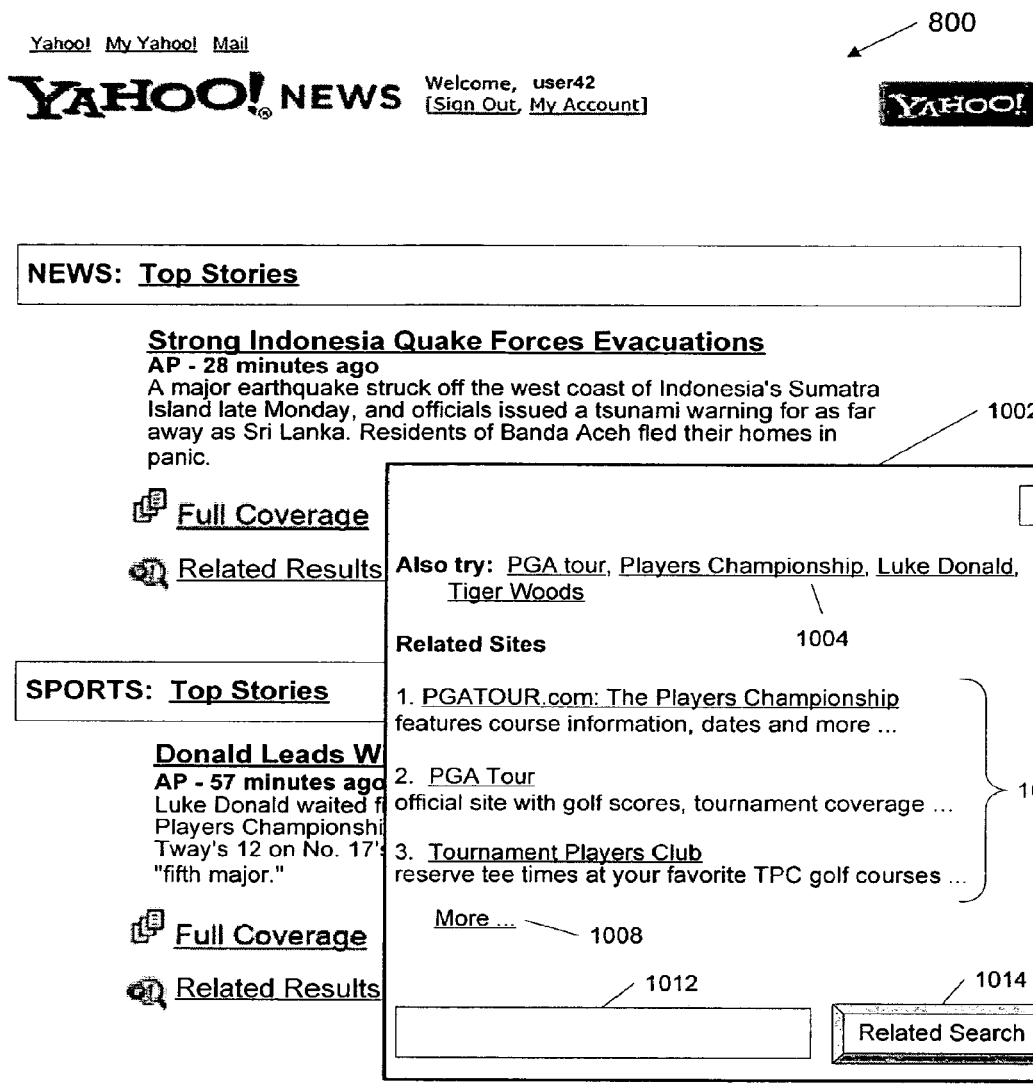
FIG. 10 illustrates a contextual search interface that may appear when a user activates a contextual search icon in the hosting page of FIG. 8.

FIG. 10 illustrates an overlay 1002 that may appear when a user activates contextual search icon 808. Overlay 1002 displays related information items that are identified based on a context vector and/or grouping labels associated with icon 808. A user may perform a contextual search by entering a query into a text box 1012 and activating "Related Search" button 1014. The query that is sent by client application 125 to search server 160 for processing advantageously includes not only the explicit user input from text box 1012 but also a representation of context vector 904 from code block 900 and optionally other information from code block 900.

A list of suggested search queries is presented in section 1004, and the user may execute one of these queries by clicking on it. Suggested search queries can be generated based on the context vector, e.g., as described in above-referenced application Ser. No. 10/903,283, application Ser. No. 11/033,100, and application Ser. No. 11/033,417.

Overlay 1002 also includes, in section 1006, a listing of related sites. In one embodiment, the listing in section 1006 is generated using the Qcat label 908 and/or Qgroup label 906 from code block 900 as well as the context vector 904. In this embodiment, overlay 1002 displays only a small number of related sites in section 1006, and the user can operate "More . . . " button 1008 to view additional related results, e.g., in a new window.

Figure 11:
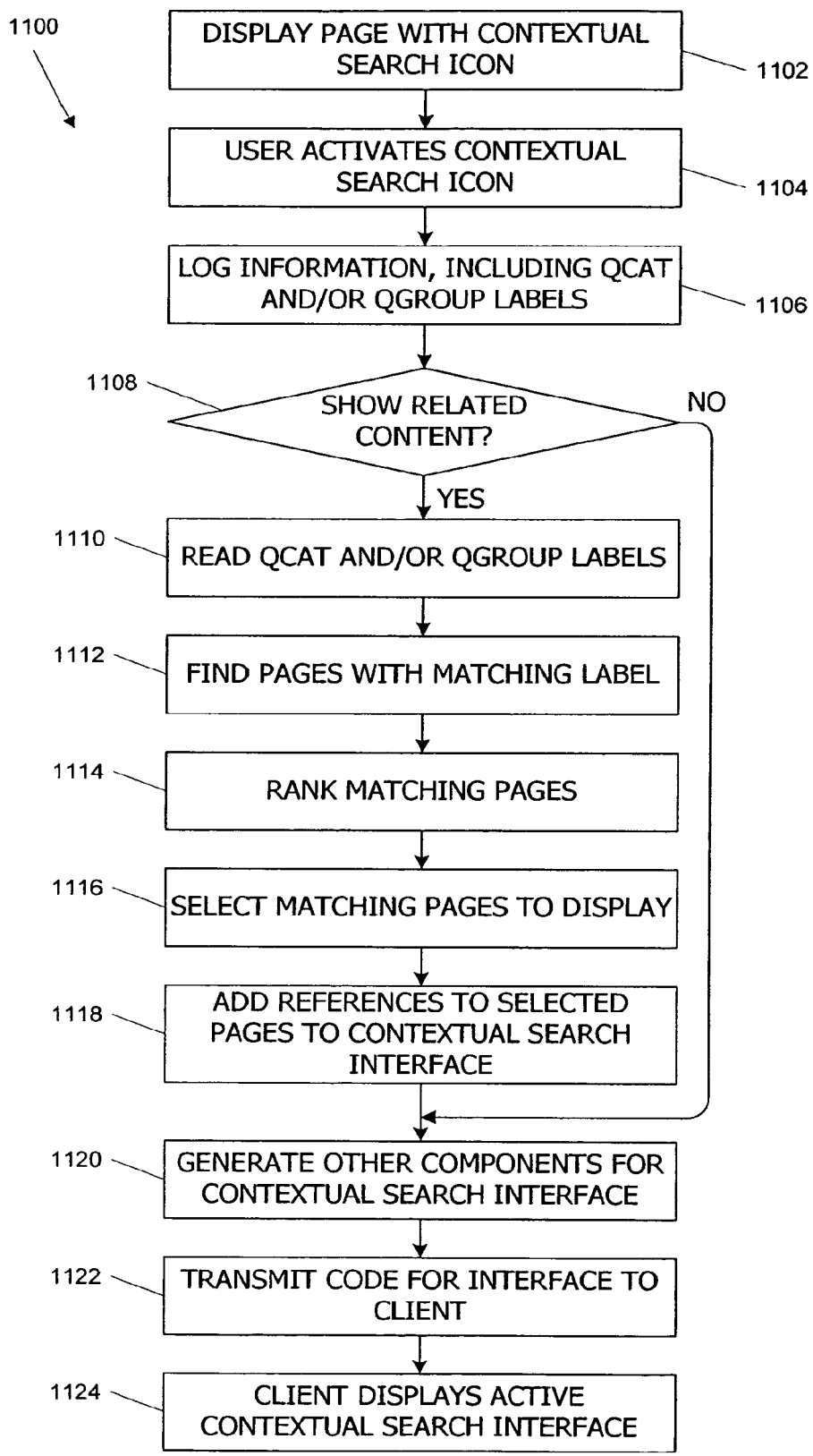
FIG. 11 is a flow diagram of a process that may be used to generated a related sites listing for a contextual search interface according to an embodiment of the present invention.

FIG. 11 is a flow diagram of a process 1100 that may be used to generate related sites listing 1006 of FIG. 10 according to an embodiment of the present invention. At step 1102, client system 120 (FIG. 2) displays a Web page with a contextual search icon, e.g., page 800 (FIG. 8) with icon 808. At step 1104, the user activates the contextual search icon, and an information request is submitted to search server 160. In one embodiment, the information request includes: (1) the URL of the hosting page of the contextual search icon; (2) the context vector; (3) the Qcat label (if any); (4) the Qgroup label (if any); and (5) the customization tag.

At step 1106, search server 160 logs the received information request. The logged information can be used to build indexes of pages with contextual search interfaces, as described below.

At step 1108, search server 160 determines from the customization tag whether related content is to be displayed in the active contextual search interface. If so, then at step 1110, search server 160 reads the Qcat and/or Qgroup labels from the information request. At step 1112, search server 160 identifies one or more pages with a matching Qcat label (or Qgroup label, or both), e.g., by consulting Qcat index 173 and/or Qgroup index 174.

At step 1114, search server 160 ranks the matching pages. In one embodiment, ranking includes comparing the content and/or context vectors associated with the each matching page to the content and/or context vector of the hosting page. Qgroup and/or Qcat labels may also be used in ranking.

At step 1116, search server 160 selects matching pages to be displayed. The contextual search interface displays, e.g., the top three, top five, or some other number of matching pages, and the highest ranking matching pages are advantageously selected for display. At step 1118, references to the matching pages are added to the contextual search interface, e.g., by including suitably formatted references in a code block defining overlay 1002. As noted above, the overlay may also include a control allowing the user to view pages not selected at step 1116, and this control may also be implemented by including suitable code in the code block defining overlay 1002.

At step 1120, other components of the active contextual search interface, such as suggested queries listing 1004 and query submission box 1412, are generated, e.g., as described in above-referenced application Ser. No. 10/903,283, application Ser. No. 11/033,100, and application Ser. No. 11/033, 417. At step 1122, the contextual search interface, in the form of computer-readable code for displaying the page, is transmitted to client system 120, and at step 1124, client system 120 displays the active contextual search interface.

It will be appreciated that the contextual search interface and activation process described herein are illustrative and that variations and modifications are possible. Steps described as sequential may be executed in parallel, order of steps may be varied, and steps may be modified or combined. A contextual search interface may include any combination of elements and can appear in an overlay, in-line in the hosting page, in a new window, in a new browser tab, or elsewhere as desired.

As noted above, information requests generated from contextual search icons can be logged by search server 160. The request logs can be processed to gather information about contextual search interfaces and user behavior associated with such interfaces. For example, an index of pages that have contextual search interfaces can be created. In addition, where the logged information includes grouping labels, an index keyed by grouping label (e.g., Qgroup index 173 or Qcat index 174) can be built from the log. Also, popularity scores for particular pages containing contextual search interfaces can be generated, e.g., based on the number of times an information request is sent from a page containing such an interface. This popularity information can be used, e.g., in ranking related pages selected by grouping label.

D. Use of Grouping Labels for Selecting Advertisements

In another embodiment of the present invention, Qgroup and/or Qcat labels are used to select advertisements (ads) to be displayed when a particular Web page is displayed.

It is known in the art that an advertisement can be dynamically selected when a page is displayed for a user. In accordance with an embodiment of the present invention, the selection includes matching a Qgroup or Qcat label of the page being displayed to a Qgroup or Qcat label assigned to an advertisement by a sponsor thereof. The process may be generally similar to that shown in FIG. 11, with the steps of finding and ranking matching ads being performed by an ad server and the top-ranked ad being selected for display to the user. Ranking of the matching pages can be based in part on the terms of agreements between the provider of the ad server and the sponsors of various ads, as is known in the art. Selection of advertisements is described further in Section IV below.

E. Generation of a Directory from Grouping Labels

In another embodiment of the present invention, grouping labels can be used to create a browsable directory of labeled pages. For example, in embodiments where the Qcat label represents a category name selected by the publisher from a hierarchical taxonomy, a browsable version of the taxonomy can be displayed for the user. When the user selects a category name from the taxonomy, a listing of pages labeled with the corresponding Qcat label can be displayed.

FIG. 12 is a flow diagram of a process 1200 for providing a browsable directory according to an embodiment of the present invention. Process 1200 may be performed, e.g., by search server 160 (FIG. 2) interacting with a Qcat index and with labels database 178. At step 1202, the user is provided with an initial category listing, which may include, e.g., the category labels at the top level of the taxonomy. This listing can be generated by accessing labels database 178 and provided to the user as a Web page or form. At step 1204, the user selects one of the categories from the list. At step 1206, search server identifies, using labels database 178, one or more Qcat labels corresponding to the selected category. In one embodiment, only the Qcat label that corresponds exactly to the selected category is identified. In other embodiments, additional Qcat labels (e.g., corresponding to categories one level up and/or one level down in the taxonomy from the current category) might also be identified.

At step 1208, search server 160 accesses Qcat index 173 to find pages (referred to herein as "hit pages" or "hits") that have the Qcat label(s) identified at step 1206. At step 1210, the hit pages are ranked. In one embodiment, ranking is based on a relevance score determined by comparing a context vector or other representation of the content of the hit page to the category name, e.g., using a conventional search algorithm with the category name substituted for the search query. In other embodiments, ranking might be based at least in part on page sponsorship information and/or explicit user feedback (e.g., ratings) about the page content or relevance of the page to the category. Such feedback may be collected as users browse the directory and added to the Qcat index. Conventional techniques for collecting user feedback and incorporating such feedback into page ranking may be used.

At step 1212, a listing of hit pages, in rank order, is provided to the user. In one embodiment, the listing is presented in a manner analogous to a conventional search report, with links to the top ten or twenty (or some other number of) hit pages presented in a first screen and navigation buttons for viewing links to additional pages. Each listing may include, e.g., a page title, abstract, and other information (e.g., user feedback), and may be accompanied by prompts and control elements for soliciting and accepting user feedback as to whether the page is useful or relevant to the category.

The listing advantageously is presented together with a navigation panel that allows the user to further browse the taxonomy. The navigation panel may include a list of subcategories of the current category, an option to move up in the hierarchy, and so on.

IV. Referral-Based Revenue Sharing

In some embodiments of the present invention, grouping labels similar to the Qgroup labels described above are used to define referral relationships among publishers. A first publisher, referred to herein as a "referrer," agrees to display links to content of a second publisher, referred to herein as a "reference," usually but not necessarily in exchange for payment. The agreement may be, e.g., a pay-per-click agreement, in which the reference pays the referrer each time a user clicks through to the reference's site from the referrer's site. Other agreements (such as pay-per-placement) might also be used. As will now be described, referral relationships are advantageously represented using appropriate referral grouping labels (Qref labels, also referred to herein as referral labels), with the Qref labels being used to select advertisements to be displayed at a referrer's page or site and to implement the payment agreements between the referral and reference.

A. Defining Referral Relationships

As used herein, a "referral relationship" exists where the referrer has agreed to display links to the reference's content. Such an agreement may be in exchange for payment (which may be money or any other contractually enforceable consideration). A "referral group" refers to a group of publishers that are related (directly or indirectly) by referral relationships.

Figure 13:
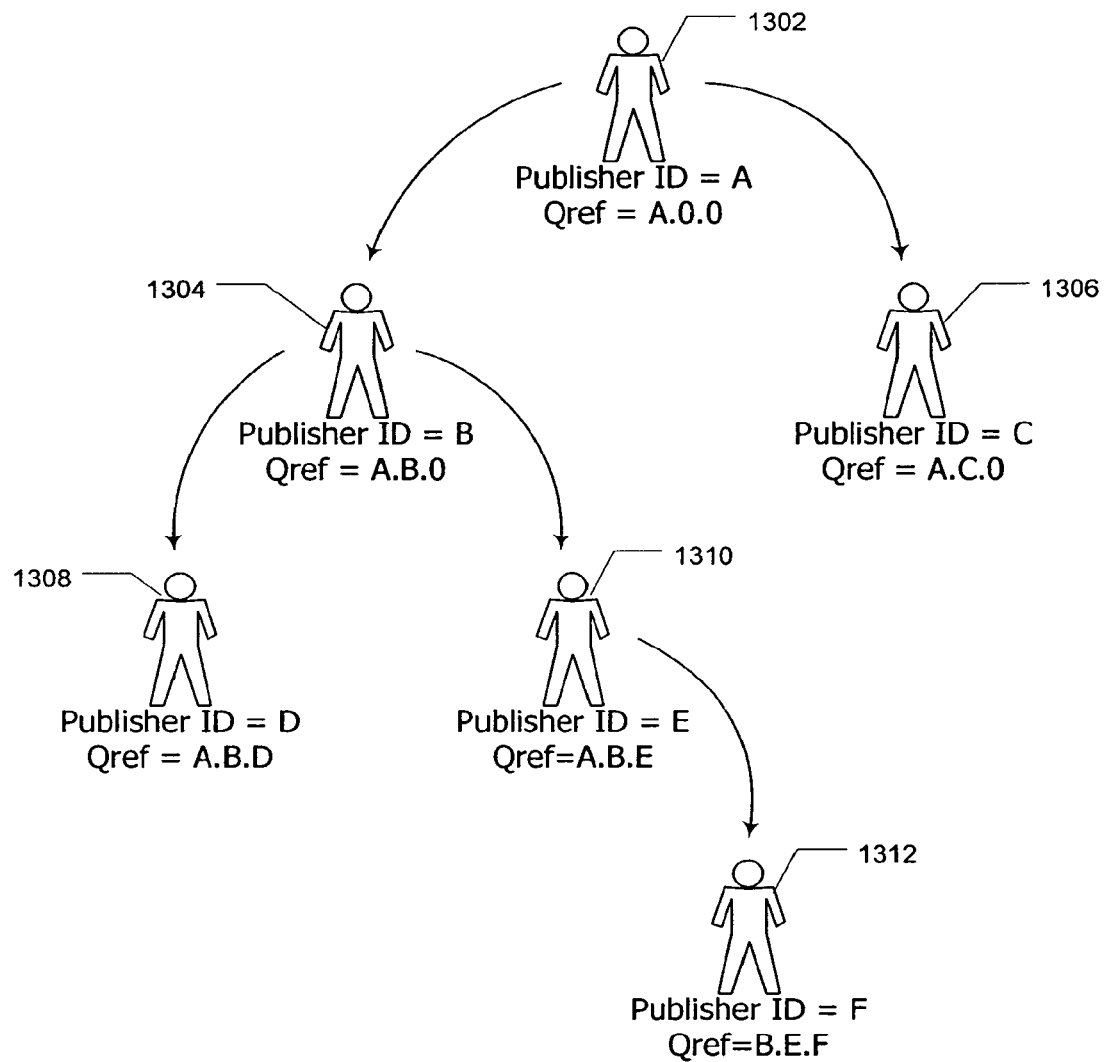
FIG. 13 illustrates a referral group according to an embodiment of the present invention.

FIG. 13 illustrates a referral group 1300 consisting of publishers 1302, 1304, 1306, 1308, 1310, and 1312 according to an embodiment of the present invention. As indicated by the referral arrows, publisher 1302 is a referrer to publishers 1304 and 1306; publisher 1304 is a referrer to publishers 1308 and 1310; and publisher 1310 is a referrer to publisher 1312. It should be noted that, within group 1300, publisher 1302 is a referrer but not a reference; herein, such a publisher is referred to herein as a "level-1" publisher. Publishers who are direct references of a level-1 publisher, such as publishers 1304 and 1306 in group 1300, are referred to herein as "level-2" publishers, publishers who are direct references of a level 2 publisher are referred to herein as "level-3" publishers, and so on. Level 1 is also said to be "higher" than level 2, and so on. While group 1300 is shown as having six publishers and four levels, it is to be understood that any number of publishers may participate in a referral group, and a referral group may have any number of levels.

In accordance with an embodiment of the present invention, each publisher in a referral group such as group 1300 is assigned a unique referral grouping label, referred to herein as a "Qref" label. Qref labels are advantageously structured to reflect the referral relationships of the group to facilitate association of labels assigned to different publishers in the referral group. Like the Qgroup labels described above, Qref labels are advantageously managed by a central server such as namespace manager 176 (FIG. 2), which assigns Qref labels to publishers and maintains a data store of valid Qref labels.

In the embodiment shown in FIG. 13, the Qref label is segmented (dots are used as field separators), but this is not required. Each Qref label has three segments that are used to indicate referral relationships between publishers up to two levels removed in the referral group. As indicated in FIG. 13, each publisher has a unique identifier (ID) shown herein as A-F for publishers 1302, 1304, 1306, 1308, 1310 and 1312 respectively; it is to be understood that any name, code or other value may be used as an ID. The Qref label for each publisher includes that publisher's ID and (where applicable) the IDs of up to two publishers at higher levels.

More specifically, publisher 1302 has Qref label "A.0.0", with the publisher ID A identifying publisher 1302. The other two segments have value 0, indicating that publisher 1302 (a level-1 publisher) is not a reference of a higher-level referrer. Publisher 1304 has Qref label "A.B.0", indicating that publisher 1302 (A) is a referrer to publisher 1304 (B); similarly, publisher 1306 has Qref label "A.C.0" indicating that publisher 1302 (A) is also a referrer to publisher 1306 (C). Publishers 1308 (D) and 1310 (E), which are both references of publisher 1304 (B), have Qref labels "A.B.D" and "A.B.E" indicating their relationship to publisher 1304 and, through publisher 1304, to publisher 1302. Publisher 1312 (F) has a Qref label "B.E.F" indicating its relationship to publisher 1310 and, through publisher 1310 to publisher 1304. The less direct relationship to publisher 1302 is not reflected in the level-4 Qref label.

It will be appreciated that the Qref label structure described herein is illustrative and that variations and modifications are possible. Segmented Qref labels of the kind shown could be extended to represent any number of levels of referral relationships (e.g., publisher 1312 could have a label such as "A.B.E.F"), and other representations may be substituted for the segmented structure shown and described herein. In some embodiments, a publisher can belong to multiple referral groups and may have a different Qref label for each such group; the same publisher can be at different levels in different referral groups. In some embodiments, a publisher may be restricted to having not more than one referral relationship to each other publisher within a referral system or to having not more than one referral relationship within a given referral group.

Figure 14:
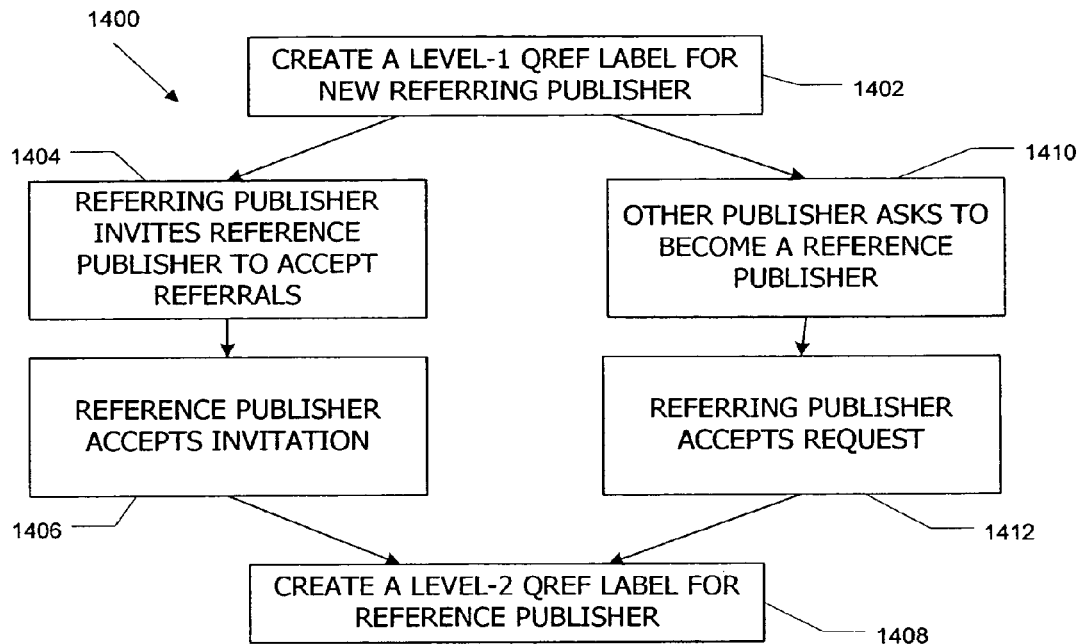
FIG. 14 is a flow diagram showing processes for creating reference grouping labels according to an embodiment of the present invention.

FIG. 14 is a flow diagram showing processes for creating Qref labels according to an embodiment of the present invention. In one embodiment, creation of Qref labels is managed by namespace manager 176 of FIG. 2. Namespace manager 176 assigns each publisher who participates in the referral system a unique ID and builds Qref labels in response to requests by publishers for establishment of a referral relationship.

Referring to FIG. 14, at step 1402, a level-1 publisher (e.g., publisher 1302 of FIG. 13) creates a Qref label, e.g., by interacting with namespace manager 176 to request a new label as described above for Qgroup labels. The level-1 publisher can add this Qref label to its content items (e.g., in contextual search interfaces) as described above. Thereafter, the level-1 publisher can invite other publishers to become references, or other publishers can request to become references, or both.

The invitation process is illustrated in steps 1404 and 1406. At step 1404, the level-1 publisher invites one or more other publishers (e.g., publisher 1304 of FIG. 13) to become references. For instance, the level-1 publisher can send an e-mail message to an invited publisher, with the message including a link to an enrollment form managed by namespace manager 176. At step 1406, the invited publisher follows the link and completes the enrollment form. In another embodiment, agreement is reached between the referrer and the reference via other channels, and namespace manager 176 is informed of the agreement by the parties. At step 1408, upon receipt of the completed enrollment form or other information indicating the existence and nature of the agreement, namespace manager 176 generates a Qref label for the new referenced publisher (a level-2 publisher) to include in its content items. In some embodiments, step 1408 may include intervention by an operator of namespace manager 176.

The request process is illustrated in steps 1410 and 1412. At step 1412, a publisher (e.g., publisher 1306 of FIG. 13) asks to become a reference of the level-1 publisher. In one embodiment, namespace manager 176 provides an interface that lists publishers seeking to be referrers, and the would-be reference publisher can request establishment of a referral relationship via namespace manager 176. The request is forwarded to the referring publisher for approval, and at step 1412, the referring publisher approves. In another embodiment, contact between the referrer and the reference occurs via a separate channel, and namespace manager 176 is informed of the agreement by the referrer. In either case, once the agreement is reached, namespace manager 176 is notified, and at step 1408, namespace manager 176 generates a Qgroup label for the new referenced publisher (at level 2) to include in its content items.

Similar processes can be extended to publishers at lower levels. For instance, once level-2 publisher 1304 of FIG. 13 has joined referral group 1300, publisher 1304 can invite other publishers (e.g., publishers 1306 and 1308) to join as level-3 publishers and/or accept requests by other publishers to join as level-3 publishers.

It will be appreciated that the processes for creating Qref labels described herein are illustrative and that variations and modifications are possible. Steps described as sequential may be executed in parallel, order of steps may be varied, and steps may be modified or combined. For instance, a referring publisher may receive requests from some would-be referenced publishers and also invite others to join; thus, the invitation and request processes are not mutually exclusive. In some embodiments, all referral relationships have the same terms and conditions (e.g., how much the referrer is to be paid, what type of event—clickthrough, placement, etc.—triggers the payment, how frequently or prominently the referrer is to display the reference's ads, and so on). In other embodiments, the terms and conditions may vary from one pair of publishers to the next, and namespace manager 176 may store information about the terms of each agreement in association with the Qref labels. Such information may be provided, in the form of rules, to ad server 180 of FIG. 2 for use in selecting sponsored content as described below.

B. Selection of Advertisements

Qref labels such as those shown in FIG. 13 are advantageously used in dynamically selecting sponsored content to be included in the referrer's content items (e.g., Web pages). For instance, a referrer can create a Web page that includes a contextual search interface configured to show ads, e.g., using the code shown in FIG. 9 and described above; the referrer elects to show acts by including an advertising value (e.g., "a") in sourceOrder tag 910. Where the referrer elects to show ads in a contextual search interface, the referrer's Qref label is also included in the contextual search interface and is submitted to search server 160 or ad server 180 (e.g., when a user activates the contextual search interface) as described above.

The reference publisher creates an ad, which can be any content item that includes a link (or other reference) to a content item published by the referenced publisher. The reference publisher includes its own Qref label in the ad. In embodiments where a reference publisher can have multiple Qref labels, the publisher can include any number of Qref labels in the ad, provided that each such Qref label corresponds to the reference publisher as a reference, not as a referrer. In some embodiments, the ad also includes a context vector representing content of the linked-to item. The reference publisher stores the ad in sponsored content database 182, e.g., by communicating with ad server 180. In some embodiments, ad server 180 performs verification operations on each ad before storing it, e.g., to confirm that the ad complies with any applicable rules related to use of the service (such as a maximum number of Qref labels that can be included). Ad server 180 may also generate a context vector for the linked-to content item automatically and store the context vector in association with the ad; ad server 180 may also periodically regenerate context vectors for ads stored in sponsored content database 182, to keep up with changes in the linked-to content associated with various ads.

Advertisements to be displayed when a user visits a reference publisher's site are advantageously selected dynamically, e.g., when the user activates a contextual search interface. For instance, referring to FIG. 11, an ad may be among the components selected at step 1120 of process 1100. In one such embodiment, search server 160 sends the Qref label from the received contextual search interface to ad server 180, which selects an ad to be displayed and returns the selected ad to search server 160.

Figure 15:
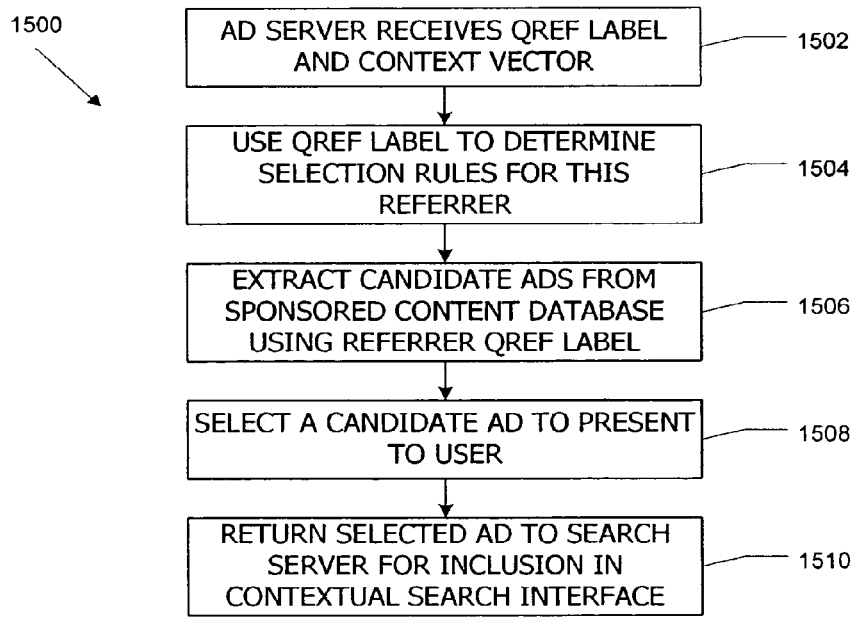
FIG. 15 is a flow diagram of a process for selecting an advertisement to display according to an embodiment of the present invention.

FIG. 15 is a flow diagram of a process 1500 that may be used by ad server 180 to select an ad (e.g., at step 1120 of process 1100) according to an embodiment of the present invention. At step 1502, ad server 180 receives a Qref label and a context vector from search server 160. At step 1504, ad server 180 uses the Qref label to determine applicable selection rules for the referrer. Such rules are based on the terms and conditions agreed to between the referrer and the reference and provided to namespace manager 176 of FIG. 2 as described above.

At step 1506, ad server 180 accesses sponsored content database 182 using the received Qref label and retrieves one or more candidate ads that have matching Qref labels. In this instance, an ad's Qref label matches a received Qref label if the ad's Qref label indicates that the ad's publisher is a reference (direct or indirect) of the publisher (referrer) having the received Qref label. For instance, referring to FIG. 13, if the Qref label "A.B.0" is received, ads having Qref labels "A.B.E" or "B.E.F" might be selected as candidates. (In some embodiments, only ads whose Qref labels indicate a direct referral relationship are selected.)

Ad server 180 selects one or more of the candidate ads at step 1508 and, at step 1510, transmits the selected ad(s) to search server 160. Selection at step 1508 may be based on various selection algorithms. For instance, in one embodiment, the ad(s) to be transmitted are selected at random from among the candidates. In some embodiments where step 1506 can return candidate ads having both direct and indirect reference relationships, the selection is based at least in part on the closeness of the reference relationship referrer and the candidate ad. (For example, referring to FIG. 13, if the Qref label "A.B.0" is received, an ad with Qref label "A.B.E" would be selected over an ad with Qref label "B.E.F.") In still another embodiment, selection is based in part on placement frequency rules and/or other terms agreed to between the referrer and the reference. In a further embodiment, selection is based at least in part on the amount of money the referrer would receive from a clickthrough on each candidate; ad server 180 uses the rules determined at step 1504 to compute the amounts.

In yet another embodiment, the selection algorithm includes comparing the respective context vectors of the ad and the referring contextual search interface, so that ads more closely related to the content the user is interested in are more likely to be shown. The implementation may be similar to content-selection algorithms described above and in above-referenced application Ser. No. 10/903,283 and application Ser. No. 10/033,100. Further, where Qcat labels as described above are also implemented, the selection algorithm can be based on comparing Qcat labels in addition to or instead of comparing context vectors. Selection algorithms that include context vector comparison, Qcat label comparison, or other criteria directed to identifying pages with similar content can select ads targeted to expressed user interests while still taking into account referral relationships among publishers.

It will be appreciated that ad selection algorithms may include multiple criteria, including any or all of those described herein. In some embodiments, ad server 180 may select multiple ads to be displayed and may rank the ads (e.g., as described above for related content in general) to determine an order of display. Any or all of the ad selection criteria described herein may also be used as factors in ranking candidate ads. In embodiments where a contextual search interface includes multiple Qref labels, ad server 180 might select one ad per Qref label or select one or more ads across all of the possible Qref labels, e.g., using any or all of the criteria above to select between ads that include different Qref labels. Ads can be displayed as inline ads, pop-up ads, or other types of ads as desired.

C. Revenue Sharing

Figure 16:
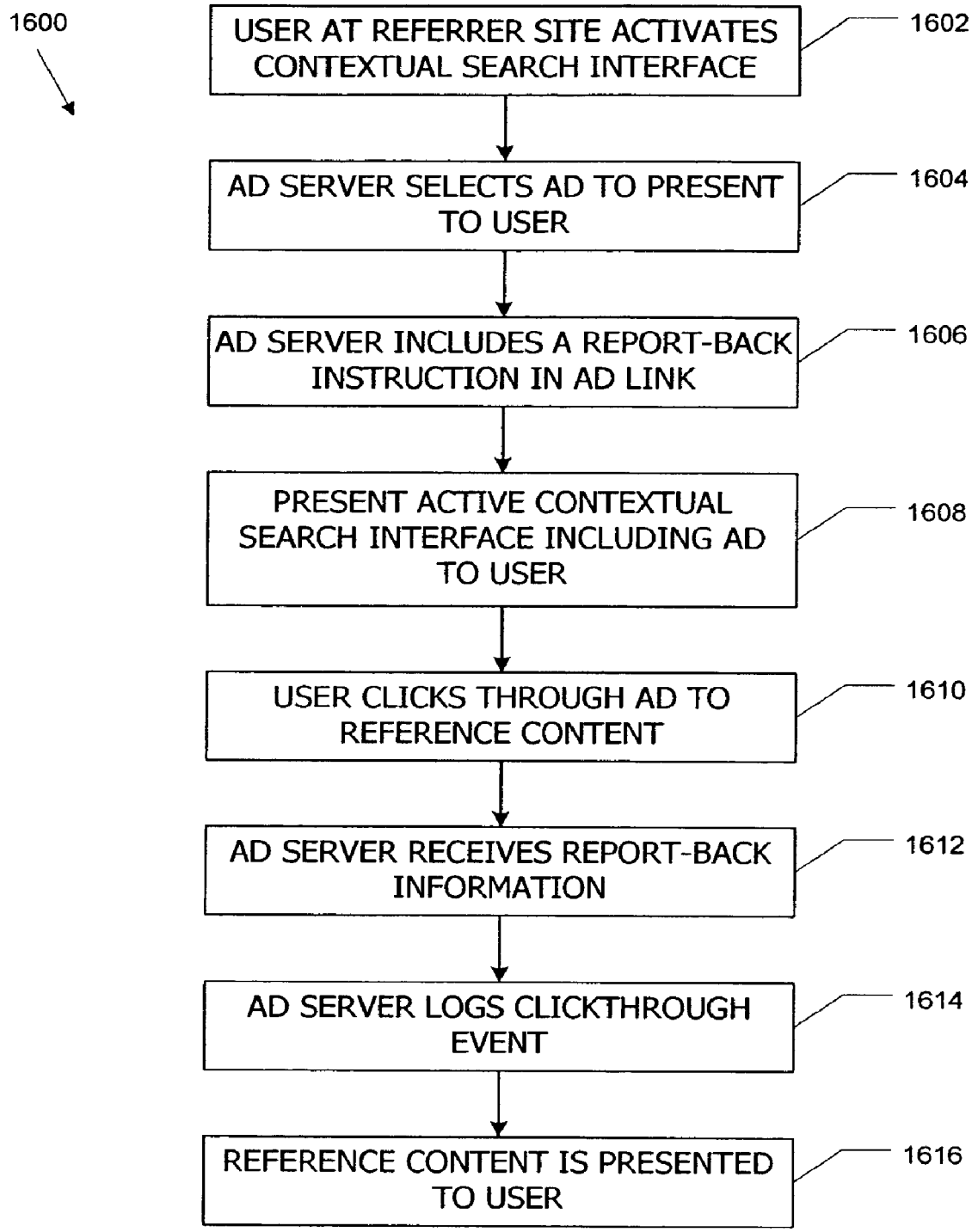
FIG. 16 is a flow diagram of a tracking process for tracking user clickthroughs according to an embodiment of the present invention.

Ad server 180 advantageously also tracks clickthroughs on displayed ads so that the revenue-sharing provisions of the referral agreements between various publishers can be enforced. FIG. 16 is a flow diagram of a tracking process 1600 implemented in ad server 180 according to an embodiment of the present invention.

At step 1602, a user visiting the referrer's site activates a contextual search interface, and at step 1604, ad server 180 selects an ad to be included in the contextual search interface, e.g., in accordance with process 1500 described above. At step 1606, ad server 180 inserts a report-back instruction in the link included in the ad. The report-back instruction advantageously includes the Qref labels associated with the ad (or with the contextual search interface in which the ad is to be displayed) or other information from which the Qref labels can be determined, such as an encoded version of the labels, an index to a lookup table, or the like.

At step 1608, the active contextual search interface, including the ad, is displayed for the user, and at step 1610, the user clicks through the ad to the referenced site. At this point, the report-back information is sent to ad server 180 (step 1612). At step 1614, ad server 180 logs the information, which may include, e.g., the Qref label of the referrer's contextual search interface, the Qref label of the ad that was displayed, and/or any other information as desired. At step 1616, the user receives the referenced content. Sending of the report-back information is advantageously transparent to the user, and conventional techniques for transparently reporting user activity may be used.

The log information is processed periodically to update accounts maintained for various publishers. For instance, log information can be processed daily, weekly, hourly or in (approximately) real time as desired. In one embodiment, an accounting server (not shown in FIG. 2) receives the log information from ad server 180 and updates the accounts periodically.

The accounting server is advantageously provided with information about the consideration agreed to between each pair of publishers and, where multi-level revenue sharing is implemented, information about what percentage of a referrer's revenue from a clickthrough is to be forwarded to a higher level, or "upstream" referrer.

Figure 17:
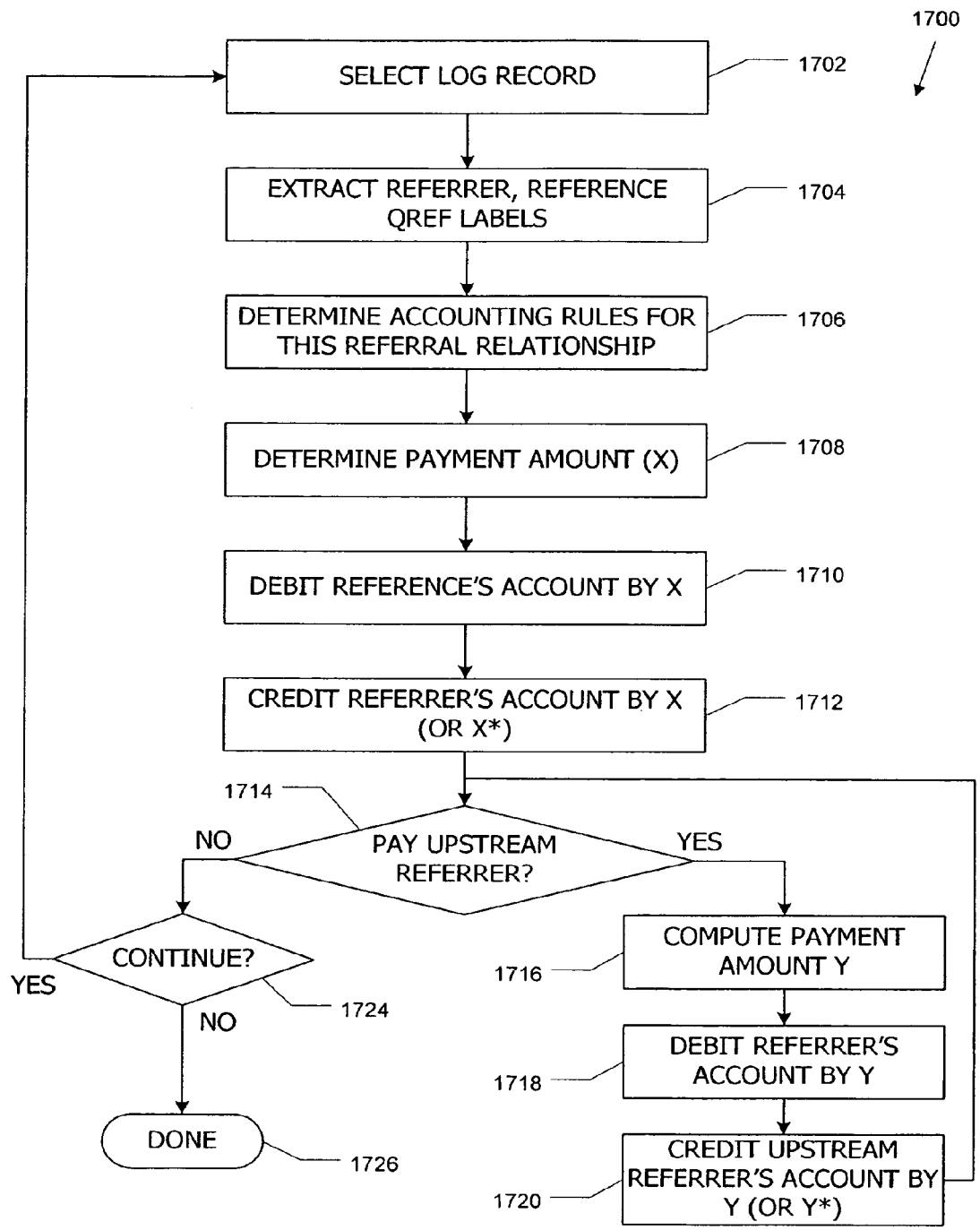
FIG. 17 is a flow diagram of an accounting process according to an embodiment of the present invention.

FIG. 17 is a flow diagram of an accounting process 1700 according to an embodiment of the present invention. At step 1702, a log record is selected for processing. At step 1704, the Qref labels of the referrer and the reference are extracted from the log record. It should be noted that in some embodiments where all referrals are between adjacent levels in a referral group, only the Qref label of the reference need be logged. For example, referring to FIG. 13, if the log indicates that the reference's Qref label is "A.B.E," it can be inferred that publisher 1310 was the reference and publisher 1302 was the referrer.

At step 1706, the rules (in particular rules related to a payment amount) for the referral relationship between the referrer and the reference are determined, e.g., by a lookup operation in a database maintained by ad server 180 or namespace manager 176 of FIG. 2. Based on the rules, a payment amount (X) is determined at step 1708. At step 1710, the amount X is debited from the account of the reference. At step 1712, the amount X is credited to the account of the referrer. In embodiments where the provider of ad server 180 operates on commission, the amount X can be reduced (to X*) by the commission amount and the amount X* credited to the referrer, with the difference being owed to the service provider by the referrer.

At step 1714 it is determined whether the referrer in turn is to pay a higher-level referrer. In one embodiment, this determination can be made from the structure of the Qref label for the referrer. For instance, suppose that in FIG. 13, it is agreed among the publishers that publishers who receive payment for a referral will remit a portion of that payment to the publisher at the next higher level in the referral group (if there is a next higher level). If the Qref label for the reference is "A.B.E", then it can be determined that referrer B should remit a portion of the payment received from reference E to higher-level referrer A. If the Qref label for the reference is "A.B.0", then B is the reference and it can be determined that referrer A (a level-1 publisher) does not need to remit payment to anyone else.

If a payment to a higher-level referrer is owed, then at step 1716, the payment amount Y is computed, e.g., as a percentage of the amount X. At step 1718, the amount Y is debited from the account of the referrer, and at step 1720, the amount Y is credited to the account of the higher-level referrer. Again, in embodiments where the provider of ad server 180 operates on commission, the amount Y can be reduced (to Y*) by the commission amount and the amount Y* credited to the higher-level referrer, with the difference being owed to the service provider by the higher-level referrer. Process 1700 then returns to step 1714 to determine whether a further upstream propagation of payments is required.

After some number of iterations, at step 1714, it is determined that no further payment to a higher-level referrer is owed. At that point, process 1700 continues to step 1724, where it is determined whether to continue processing log records (returning to step 1702) or exit (step 1726).

It will be appreciated that the accounting process described herein is illustrative and that variations and modifications are possible. Steps described as sequential may be executed in parallel, order of steps may be varied, and steps may be modified or combined.

It should be noted that in some embodiments, any Qref label maps to exactly one publisher, and one account per publisher can be maintained regardless of the number of Qref labels that map to the publisher, the number of revenue-sharing referral groups to which the publisher belongs, or the publisher's level within different referral groups. In some embodiments, publishers can view reports of their advertising placements, revenues, and charges grouped by Qref label and can use this information in evaluating whether to continue a specific referral relationship.

For instance, the number of times a given referrer (e.g., publisher A) shows ads for a given reference (e.g., publisher B) can be logged and reported to publisher A and/or publisher B; in addition, clickthroughs resulting from such placements can also be logged and reported. Publisher B can use such information to evaluate how effectively referrer A is driving traffic toward B's content, and publisher A can use such information to evaluate which references (e.g., B) are generating satisfactory amounts of revenue. Any aspect of advertising behavior can be logged and reported, and account management software of generally conventional design may be used to enable publishers to review and examine their accounts. The software may also periodically generate bills to publishers whose payments exceed their revenues and/or issue payments to publishers whose accounts have a surplus.

A provider of a revenue-sharing advertising service of the type described herein can also generate revenue for itself. In some embodiments, the provider collects a commission on payments from one publisher to another (e.g., as described above with reference to FIG. 17). In other embodiments, the provider collects a participation fee from advertisers who use the system. A combination of commission-based and fee-based payments may also be used.

It will be appreciated that the revenue sharing system described herein is illustrative and that variations and modifications are possible. For instance, while embodiments described herein may refer specifically to pay-per-click advertising, other events (e.g., display of an ad on a referrer's site, a completed purchase resulting from a clickthrough to the advertiser's site, or any other event that can be reported back to ad server 180) might also be used as payment triggers. Referral agreements may include multiple payment trigger events, with different events triggering different payment amounts.

V. Further Embodiments

While the invention has been described with respect to specific embodiments, one skilled in the art will recognize that numerous modifications are possible. For instance, the Qgroup, Qcat, and Qref labels are illustrative. Any number of grouping labels may be supported, and a grouping label may indicate any definable relationship.

In addition, some embodiments may include user feedback features and/or a manual or automated editorial review process for evaluating the appropriateness of the grouping labels assigned to particular pages. Where a grouping label is used inappropriately (e.g., where a Qcat label is included in a page whose content does not relate to the category or where a Qref label provided in an ad does not correspond to a referral relationship known to the namespace server), the grouping index, sponsored content database, or other data store can be updated such the label is, in effect, ignored.

The embodiments described herein may make reference to Web sites pages, links, and other terminology specific to instances where the World Wide Web (or a subset thereof) serves as the search corpus. It should be understood that the systems and processes described herein can be adapted for use with a different search corpus (such as an electronic database or document repository) and that results may include content as well as links or references to locations where content may be found.

In addition, the invention has been described with reference to computer systems having particular hardware and software elements. It is to be understood that other systems with different combinations of hardware and/or software components could also be implemented.

Thus, although the invention has been described with respect to specific embodiments, it will be appreciated that the invention is intended to cover all modifications and equivalents within the scope of the following claims.

The invention claimed is:

1. A computer-implemented method for providing advertisements to a client computer, the method comprising:
    defining a plurality of identifiers, wherein each identifier is assigned to one of a plurality of publishers, wherein different publishers of the plurality of publishers are assigned different identifiers;
    receiving a request originating from a client computer for advertising content; wherein the request includes a first referral label that includes a first identifier that identifies a first publisher of a plurality of publishers, wherein the first publisher published a first content item with which the advertising content is to be presented;
    based on the first identifier included in the first referral label, searching for an advertisement, of a plurality of available advertisements, that (a) is associated with another referral label that specifies a referral relationship that involves the first publisher, and (b) is published by a publisher other than the first publisher, wherein at least some of the referral labels specify referral relationships between different publishers;
    based on said searching, selecting a first advertisement that is associated with a second referral label, the first advertisement being published by a second publisher of the plurality of publishers, wherein the second referral label specifies a referral relationship that involves the first publisher; and
    in response to the request, transmitting the first advertisement to the client computer for presentation, to a user, with the first content item;
    wherein at least the steps of receiving, searching, selecting, and transmitting are performed by one or more computing devices.

2. The method of claim 1, wherein the step of searching for an advertisement further comprises:
    searching a sponsored content database that associates each of a plurality of advertisements with one of the referral labels, wherein each advertisement includes a link to a content item.

3. The method of claim 1, further comprising:
    in the event that a user clickthrough on the first advertisement is reported by the client computer, logging a referral from the first referral label to the second referral label.

4. The method of claim 1, wherein the first referral label is extracted from the first content item.

5. The method of claim 4 wherein the first referral label is extracted from a contextual search code block included in the first content item.

6. The method of claim 5 wherein the contextual search code block further includes a first context vector representing content of at least a portion of the first content item and wherein the request for the advertisement further includes the context vector.

7. The method of claim 6 wherein each advertisement in the sponsored content database is further associated with a respective ad context vector and wherein the step of searching for an advertisement includes identifying a plurality of candidate advertisements, each candidate advertisement being associated with a referral label that represents a referral relationship between the first publisher and a publisher of the candidate advertisement; and wherein the step of selecting the first advertisement includes selecting one of the plurality of candidate advertisements as the first advertisement based at least in part on a comparison between the first context vector and the respective ad context vectors associated with the candidate advertisements.

8. The method of claim 3 further comprising, at an accounting server:
    receiving the logged referral from the first referral label to the second referral label;
    crediting a first referral fee to the first publisher, wherein the first publisher is identified using the first referral label; and debiting the first referral fee from the second publisher, wherein the second publisher is identified using the second referral label.

9. The method of claim 3 wherein the user executes the clickthrough on the first advertisement and thereby accesses a second content item published by the second publisher, the method further comprising:
receiving a request originating from the client computer for advertising content to be presented with the second content item, the request including the second referral label, wherein the second referral label is extracted from the second content item and includes a second identifier that identifies the second publisher;
based on the second identifier included in the second referral label, searching for an advertisement of a plurality of available advertisements, that (a) is associated with another referral label that specifies a referral relationship that involves the second publisher, and (b) is published by a publisher other than the second publisher;
selecting a second advertisement that is associated with a third referral label, the second advertisement being provided by a third one of the plurality of publishers, wherein the third referral label specifies a referral relationship that involves the second publisher;
transmitting the second advertisement for presentation to the user by the client computer; and
in the event that a user clickthrough on the second advertisement is reported by the client computer, logging a referral from the second referral label to the third referral label.

10. The method of claim 9 further comprising, at an accounting server:
receiving the logged referral from the second referral label to the third referral label;
crediting a second referral fee to the second publisher, wherein the second publisher is identified using the second referral label; and
debiting the second referral fee from the third publisher, wherein the third publisher is identified using the third referral label.

11. The method of claim 10 further comprising, at the accounting server:
crediting a portion of the second referral fee to the first publisher; and debiting the portion of the second referral fee from the second publisher.

12. The method of claim 1, wherein the second referral label includes the first identifier and also includes a second identifier identifying the second publisher.

13. The method of claim 12, further comprising:
receiving, at a namespace manager from the first publisher, a request for a referral label;
creating, by the namespace manager, the first referral label in response to the request from the first publisher;
receiving, by the namespace manager, an instruction from the first publisher to establish a referral relationship from the first publisher to the second publisher;
in response to the instruction, issuing, by the namespace manager, an invitation to the second publisher to be referenced by the first publisher;
receiving, at the namespace manager, an acceptance from the second publisher; and
creating, by the namespace manager, the second referral label in response to the acceptance.

14. The method of claim 1, further comprising:
receiving, at a namespace manager from the first publisher, a request for a referral label;
creating, by the namespace manager, the first referral label in response to the request from the first publisher;
receiving, by the namespace manager, a request from the second publisher to establish a referral relationship from the first publisher to the second publisher;
in response to the instruction, issuing, by the namespace manager, an invitation to the first publisher to reference the second publisher;
receiving, at the namespace manager, an acceptance from the first publisher; and
creating, by the namespace manager, the second referral label in response to the acceptance.

15. The method of claim 1 wherein the content items are Web pages.

16. A computer-based system for providing advertisements to a client computer, the system comprising:
one or more processors;
a sponsored content data store configured to store a plurality of advertisements, each of the advertisements being associated with at least one of a plurality of referral labels,
wherein each referral label includes one or more identifiers, and wherein each identifier is assigned to one of a plurality of publishers, wherein different ones of the plurality of publishers are assigned different identifiers, and wherein at least some of the referral labels specify referral relationships between different ones of the plurality of publishers;
an advertising server configured to run on the one or more processors and access the sponsored content data store, the advertising server including:
input control logic configured to receive a request originating from a client computer for advertising content; wherein the request includes a first referral label of the plurality of referral labels, wherein the first referral label includes a first identifier that identifies a first publisher of the plurality of publishers, wherein the first publisher published the first content item with which the advertising content is to be presented;
searching logic configured to search, based on the first identifier included in the first referral label, for an advertisement, of a plurality of available advertisements, that (a) is associated with another referral label that specifies a referral relationship that involves the first publisher, and (b) is published by a publisher other than the first publisher;
selection control logic configured to select, from the sponsored content data store, a first advertisement that is associated with a second referral label, the first advertisement being published by a second one of the plurality of publishers, wherein the second referral label specifies a referral relationship that involves the first publisher;
output control logic configured to transmit, in response to the request, the first advertisement to the client computer for presentation, to a user, with the first content item.

17. The system of claim 16, further comprising
logging control logic configured to run on the one or more processors to log a referral from the first referral label to the second referral label in the event that a user clickthrough on the first advertisement is reported by the client computer.

18. The system of claim 16 further comprising:
an accounting server configured to run on the one or more processors to process the logged referrals, wherein processing of the logged referrals includes crediting a first referral fee to the first publisher, wherein the first publisher is identified using the first referral label, and debiting the first referral fee from the second publisher, wherein the second publisher is identified using the second referral label.

19. The system of claim 16 further comprising:
a namespace manager configured to run on the one or more processors to generate referral labels in response to requests from publishers.

20. The system of claim 18 wherein the second referral label includes the first identifier and also includes a second identifier identifying the second publisher.

21. The system of claim 19 wherein the namespace manager is further configured such that the second referral label is generated in response to an indication of a referral agreement between the first and second publishers.

22. A non-transitory computer-readable storage medium storing one or more sequences of instructions which, when executed by one or more processors, causes the one or more processors to perform the method recited in claim 1.

23. A non-transitory computer-readable storage medium storing one or more sequences of instructions which, when executed by one or more processors, causes the one or more processors to perform the method recited in claim 2.

24. A non-transitory computer-readable storage medium storing one or more sequences of instructions which, when executed by one or more processors, causes the one or more processors to perform the method recited in claim 3.

25. A non-transitory computer-readable storage medium storing one or more sequences of instructions which, when executed by one or more processors, causes the one or more processors to perform the method recited in claim 4.

26. A non-transitory computer-readable storage medium storing one or more sequences of instructions which, when executed by one or more processors, causes the one or more processors to perform the method recited in claim 5.

27. A non-transitory computer-readable storage medium storing one or more sequences of instructions which, when executed by one or more processors, causes the one or more processors to perform the method recited in claim 6.

28. A non-transitory computer-readable storage medium storing one or more sequences of instructions which, when executed by one or more processors, causes the one or more processors to perform the method recited in claim 7.

29. A non-transitory computer-readable storage medium storing one or more sequences of instructions which, when executed by one or more processors, causes the one or more processors to perform the method recited in claim 8.

30. A non-transitory computer-readable storage medium storing one or more sequences of instructions which, when executed by one or more processors, causes the one or more processors to perform the method recited in claim 9.

31. A non-transitory computer-readable storage medium storing one or more sequences of instructions which, when executed by one or more processors, causes the one or more processors to perform the method recited in claim 10.

32. A non-transitory computer-readable storage medium storing one or more sequences of instructions which, when executed by one or more processors, causes the one or more processors to perform the method recited in claim 11.

33. A non-transitory computer-readable storage medium storing one or more sequences of instructions which, when executed by one or more processors, causes the one or more processors to perform the method recited in claim 12.

34. A non-transitory computer-readable storage medium storing one or more sequences of instructions which, when executed by one or more processors, causes the one or more processors to perform the method recited in claim 13.

35. A non-transitory computer-readable storage medium storing one or more sequences of instructions which, when executed by one or more processors, causes the one or more processors to perform the method recited in claim 14.

36. A non-transitory computer-readable storage medium storing one or more sequences of instructions which, when executed by one or more processors, causes the one or more processors to perform the method recited in claim 15.

* * * * *